(12) United States Patent
Watanabe et al.

(10) Patent No.: US 7,614,374 B2
(45) Date of Patent: Nov. 10, 2009

(54) ROLLING BEARING FOR ROCKER ARM

(75) Inventors: Yasuyuki Watanabe, Iwata (JP); Akihiko Katayama, Iwata (JP)

(73) Assignee: NTN Corporation, Osaka (JP)

(*) Notice: Subject to any disclaimer, the term of this patent is extended or adjusted under 35 U.S.C. 154(b) by 236 days.

(21) Appl. No.: 11/659,316

(22) PCT Filed: Jul. 6, 2005

(86) PCT No.: PCT/JP2005/012455

§ 371 (c)(1), (2), (4) Date: Feb. 2, 2007

(87) PCT Pub. No.: WO2006/013696

PCT Pub. Date: Feb. 9, 2006

(65) Prior Publication Data

US 2008/0163839 A1 Jul. 10, 2008

(30) Foreign Application Priority Data

| Aug. 2, 2004 | (JP) | ............. 2004-225925 |
| Aug. 4, 2004 | (JP) | ............. 2004-228037 |
| Aug. 26, 2004 | (JP) | ............. 2004-246463 |
| Aug. 27, 2004 | (JP) | ............. 2004-248859 |
| Sep. 22, 2004 | (JP) | ............. 2004-275154 |

(51) Int. Cl.
F01L 1/18 (2006.01)

(52) U.S. Cl. .................... 123/90.39; 29/888.2; 74/559; 384/554

(58) Field of Classification Search ............ 123/90.39, 123/90.44, 90.48; 29/888.2; 74/559, 567, 74/569; 384/548, 552, 553, 554
See application file for complete search history.

(56) References Cited

U.S. PATENT DOCUMENTS

| 4,727,832 A | 3/1988 | Miyamura et al. |
| 6,199,527 B1 | 3/2001 | Okubo et al. |
| 7,207,933 B2 * | 4/2007 | Goto et al. ............ 492/58 |

(Continued)

FOREIGN PATENT DOCUMENTS

CN 1493772 5/2004

(Continued)

OTHER PUBLICATIONS

Chinese Office Action, with English translation, issued in Chinese Patent Application No. CN 200580025730.6, mailed Apr. 25, 2008.

(Continued)

*Primary Examiner*—Ching Chang
(74) *Attorney, Agent, or Firm*—McDermott Will & Emery LLP

(57) ABSTRACT

A rolling bearing for a rocker arm includes an outer ring in rolling contact with a cam of an engine, an outer-ring shaft placed inside the outer ring and fixed to the rocker arm, and a plurality of rollers provided between the outer ring and the outer-ring shaft. At least one of the outer ring, the outer-ring shaft and the rolling elements has a nitrogen-rich layer, an austenite crystal grain size number in a range exceeding 10, and a surface hardness Hv of at least 653. Thus, the life can be extended.

32 Claims, 19 Drawing Sheets

U.S. PATENT DOCUMENTS

| | | |
|---|---|---|
| 2001/0035234 A1 | 11/2001 | Okita et al. |
| 2004/0079310 A1 | 4/2004 | Suzuki et al. |
| 2004/0132598 A1 | 7/2004 | Goto et al. |
| 2007/0269336 A1 | 11/2007 | Ohki et al. |

FOREIGN PATENT DOCUMENTS

| | | |
|---|---|---|
| CN | 1497194 | 5/2004 |
| EP | 1 411 142 A | 4/2004 |
| JP | 62-7908 | 1/1987 |
| JP | 63-185917 | 11/1988 |
| JP | 2-168022 | 6/1990 |
| JP | 3-31503 | 2/1991 |
| JP | 3-63703 | 6/1991 |
| JP | 3-199716 | 8/1991 |
| JP | 3-119508 | 12/1991 |
| JP | 5-179350 | 7/1993 |
| JP | 5-288257 | 11/1993 |
| JP | 5-321616 | 12/1993 |
| JP | 07-190173 | 7/1995 |
| JP | 7-310509 | 11/1995 |
| JP | 10-30150 | 2/1998 |
| JP | 10-47334 | 2/1998 |
| JP | 10-103339 | 4/1998 |
| JP | 10-110720 | 4/1998 |
| JP | 11-101247 | 4/1999 |
| JP | 2000-38906 | 2/2000 |
| JP | 2000-38907 | 2/2000 |
| JP | 2000-54811 | 2/2000 |
| JP | 2000-129347 | 5/2000 |
| JP | 2000-205284 | 7/2000 |
| JP | 3125434 | 11/2000 |
| JP | 2001-65576 | 3/2001 |
| JP | 2001-280348 | 10/2001 |
| JP | 2002-31212 | 1/2002 |
| JP | 2002-105536 | 4/2002 |
| JP | 2002-194438 | 7/2002 |
| JP | 2002-327605 | 11/2002 |
| JP | 2003-226918 | 8/2003 |
| JP | 2004-60797 | 2/2004 |
| JP | 2004-60807 | 2/2004 |
| WO | WO 2005/035814 A1 | 4/2005 |

OTHER PUBLICATIONS

Japanese Final Decision for Rejection, w/ English translation thereof, issued in Japanese Patent Application No. JP 2004-228037 dated Mar. 17, 2009.

European Search Report issued in European Patent Application No. EP 05758261 dated Apr. 2, 2009.

* cited by examiner (a)

HEAT PATTERN H1

HEAT PATTERN H2

(a)  (b)

ROLLING BEARING FOR ROCKER ARM

RELATED APPLICATIONS

This application is the U.S. National Phase under 35 U.S.C. § 371 of International Application No. PCT/JP2005/012455, filed on Jul. 6, 2005, which in turn claims the benefit of Japanese Application Nos. 2004-225925, filed Aug. 2, 2004, 2004-228037, filed Aug. 4, 2004, 2004-246463, filed Aug. 26, 2004, 2004-248859, filed Aug. 27, 2004, and 2004-275154, filed Sep. 22, 2004, the disclosures of which Applications are incorporated by reference herein.

TECHNICAL FIELD

The present invention relates to a rolling bearing for a rocker arm used for opening/closing an intake valve or exhaust valve of an automobile engine. More specifically, the invention relates to a roller bearing used for a rocker arm and having extended life.

BACKGROUND ART

Of recent rolling bearings, many bearings such as those for rocker arms used for opening/closing an intake valve or exhaust valve of an engine, for example, are applied to those uses under high-speed heavy-load conditions in spite of the fact that these bearings are full-type rolling bearings. In particular, regarding a full-type rolling bearing without cage, skew is likely to occur for the reasons that rollers interfere with each other and roller positions are not smoothly controlled. Further, if a lubricating oil is not appropriately supplied into the bearing, an inadequate lubricating condition is likely to occur. As a result, heat is generated from sliding or the surface pressure is locally increased. Thus, in spite of a large load-carrying capacity as calculated, surface damages (peeling, smearing, surface-originated peeling) and inside-originated peeling are likely to occur.

Like a bearing for a rocker arm used for opening/closing an intake valve or exhaust valve of an engine, for the bearing having an outer ring whose outer circumference is in rolling contact with a cam, many of improvements have been made chiefly for the purpose of improving the outer circumference of the outer ring. For example, compression residual stress induced by such a process as shot peening and increased hardness induced by high-concentration carbonitriding (process-induced effects) have been used to extend the life, chiefly for improving the circumference of the outer ring that is in rolling contact with the cam.

Some techniques that have been known take the following measures.

(1) In order to improve the rolling fatigue life, shot peening is performed on the race of a bearing component, and a reinforced layer, a retained-austenite-containing layer and a quench-hardened layer are provided in the bearing component from the surface side to the inner side in this order (Japanese Patent Laying-Open No. 2-168022 (Patent Document 1)).

(2) A technique that efficiently adjusts the size and area ratio of carbide in a martensite structure, the amount of retained austenite and the hardness, by performing shot peening (Japanese Patent Laying-Open No. 2001-065576 (Patent Document 2)).

(3) In order to improve the rolling fatigue life, the residual-compression-stress peak level and distribution resultant from shot peening are made equal to the maximum shearing stress and operational depth that is exerted in use (Japanese Patent Laying-Open No. 3-199716 (Patent Document 3)).

(4) A control method for a carburized bearing, applying shot peening for prolonging the life, and providing a final-surface-finished surface so that the combination of residual compression stress σ (MPa) and retained austenite γ (%) satisfies: $0.001\sigma + 0.3\gamma \geq 1.0$.

(5) A cam follower device (bearing for rocker arm) has a cam-follower outer ring whose outer circumference is equivalent in hardness to an associated cam and whose inner circumference is higher in hardness than the outer circumference (Japanese Utility Model Laying-Open No. 3-119508 (Patent Document 4)).

(6) In a component that is in rolling contact or rolling slide contact with another opposite component, a surface layer with a depth of 0 to 50 μm from the surface has a maximum compression stress of 50 to 110 kgf/mm², a hardness of HV 830 to 960, retained austenite of at least 7%, and an average surface roughness of at most 25 μm, which are achieved through shot peening (Japanese Patent No. 3125434 (Patent Document 5)).

Although improvements for prolonging the rolling life of an outer-ring shaft corresponding to the inner ring, rollers and the whole bearing have been relatively few, some improvements have been made as shown below in terms of material properties for providing heat resistance and microstructure stability as well as increased hardness by carbonitriding, and thereby prolonging the life of the bearing.

(7) For a cam follower bearing (bearing for rocker arm) of an engine valve mechanism, a calculated life of the bearing, at a rated engine rpm, of 1000 hours or longer is achieved (Japanese Patent Laying-Open No. 2000-038907 (Patent Document 6)).

(8) In order to achieve a bearing shaft for a cam follower device (bearing for rocker arm) having the carbide ratio=10 to 25%, the ratio of decomposed austenite content to initial retained austenite content=1/10 to 3/10, the end-face hardness=HV 830 to 960, and average surface roughness of 25 μm or less, a bearing steel is carbonitrided and hard shot peened (Japanese Patent Laying-Open No. 10-047334 (Patent Document 7)).

(9) A solid lubricant film of high polymer for example is formed on a cam follower shaft (bearing component for rocker arm) for improving wear resistance of the shaft (Japanese Patent Laying-Open No. 10-103339 (Patent Document 8)).

(10) A cam follower shaft (bearing component for rocker arm) is made of a tool steel for example and is ion-nitrided or ion-plated at a temperature lower than a tempering temperature so as to have a high hardness (Japanese Patent Laying-Open No. 10-110720 (Patent Document 9)).

(11) A cam follower bearing for an engine valve mechanism (bearing for rocker arm) having a bending stress of 150 MPa or less with respect to the shaft (Japanese Patent Laying-Open No. 2000-038906 (Patent Document 10)).

(12) A cam follower for an engine valve mechanism (rolling bearing for valve mechanism) that has a phosphate film which is excellent in lubricating-oil retention and provided on a rolling surface of a bearing component (Japanese Patent Laying-Open No. 2002-031212 (Patent Document 11)).

(13) A cam follower for an engine valve mechanism (bearing for valve mechanism) that has a crowning in a region of a shaft where rollers roll (Japanese Utility Model Laying-Open No. 63-185917 (Patent Document 12)).

(14) A carburized shaft having a rolling surface layer which is high-concentration carburized or carbonitrided with a carbon concentration of 1.2% to 1.7% and having an internal hardness of HV 300 (Japanese Patent Laying-Open No. 2002-194438 (Patent Document 13)).

There is another problem regarding the rocker arm. In such a case where both ends of an outer-ring shaft are caulked to be fixed to an outer-ring support member, although a rolling surface of the outer-ring shaft should have a high hardness, the ends thereof should be soft enough to be caulked. Further, after the shaft ends are caulked to be fixed, the strength (hardness) should be high enough for preventing loosening in use. The following document discloses caulking of both ends of an outer-ring shaft of a roller rocker.

(15) The outer surface of an outer-ring shaft is uniformly induction-hardened and then tempered, and thereafter only the ends of the shaft are high-frequency annealed and accordingly softened (Japanese Patent Laying-Open No. 05-179350 (Patent Document 14)).

In recent years, environmental issues have become salient. For automobiles as well, enhancement of fuel economy is legally mandated and strongly called for. Accordingly, components constituting an engine are also required to have a lighter weight and compactness. Therefore, a rocker arm used for opening/closing an intake valve or exhaust valve of an engine is also required to be lightweight and compact and naturally, a bearing for the rocker arm is also required to be lightweight and compact.

As a method of reducing the weight of a bearing, U.S. Pat. No. 4,727,832 (Patent Document 15) discloses a method employing an inner ring that is a hollow cylinder in shape (pipe). The bearing may be made compact by being downsized. However, as for the downsizing of the bearing, because of limitations due to the shape of the cam and the lift amount in valve opening/closing, the size cannot be decreased simply and thus downsizing is chiefly done in the direction of the width (shaft). Therefore, the method for making the bearing lightweight and compact is chiefly achieved by providing an inner ring of hollow cylinder in shape and downsizing in the direction of the width.

Here, in making the bearing lightweight and compact, some issues have to be considered. They are deterioration in crack fatigue strength of the outer ring or inner ring and shortening of the rolling fatigue life of the roller or inner ring.

The applicant has been successful in improving, through improvements in heat treatment technique, crack fatigue strength and rolling fatigue life for an outer ring, rollers and an inner ring (entirely hardened inner ring) that undergoes press-fitting, pinning or the like (except for caulking) to be fixed to a rocker arm. Therefore, for an inner ring that is caulked to be fixed to a rocker arm, it is necessary to improve crack fatigue strength and rolling fatigue life.

The applicant has also been successful in improving rolling fatigue life of an inner ring that is caulked to be fixed to a rocker arm. Thus, a remaining goal is to improve crack fatigue strength of an inner ring having a hollow cylindrical shape.

Conventionally, for an inner ring caulked to be fixed to a rocker arm, a hollow cylindrical inner ring is not used because process steps increase and instead a solid cylindrical inner ring is employed. In order to allow an end surface to be caulked, only a raceway surface for rollers that are rolling elements is surface-hardened by high-frequency heat treatment. This is disclosed for example in Japanese Patent Laying-Open No. 62-007908 (Patent Document 16) and Japanese Patent Laying-Open No. 5-321616 (Patent Document 17).

Similarly, in the case where a hollow cylindrical inner ring is used, in order to allow an end surface to be caulked, conventionally only a raceway surface for rollers that are rolling elements is surface-hardened through high-frequency heat treatment. This is disclosed for example in Japanese Patent Laying-Open No. 3-031503 (Patent Document 18) and Japanese Patent Laying-Open No. 2000-038906 (Patent Document 10).

In particular, a hollow cylindrical inner ring has a larger bending stress due to its shape, as compared with a solid cylindrical inner ring. Therefore, there is a method providing the bending stress of 15 kgf/mm$^2$ or less to prevent breakage (see Japanese Patent Laying-Open No. 2000-038906). However, this method imposes limitations on the shape, and thus hinders the bearing from being made lightweight and compact.

Further, for an inner ring having a simple hollow cylindrical shape, since the strength is insufficient due to the above-described reason, a reinforcing material may be attached to the inner circumferential portion (see Japanese Utility Model Laying-Open No. 3-063703 (Patent Document 19)). This method, however, is accompanied by increased process steps and complexity, disadvantageously resulting in a higher price of the bearing.

Patent Document 1: Japanese Patent Laying-Open No. 2-168022

Patent Document 2: Japanese Patent Laying-Open No. 2001-065576

Patent Document 3: Japanese Patent Laying-Open No. 3-199716

Patent Document 4: Japanese Utility Model Laying-Open No. 3-119508

Patent Document 5: Japanese Patent No. 3125434

Patent Document 6: Japanese Patent Laying-Open No. 2000-038907

Patent Document 7: Japanese Patent Laying-Open No. 10-47334

Patent Document 8: Japanese Patent Laying-Open No. 10-103339

Patent Document 9: Japanese Patent Laying-Open No. 10-110720

Patent Document 10: Japanese Patent Laying-Open No. 2000-038906

Patent Document 11: Japanese Patent Laying-Open No. 2002-031212

Patent Document 12: Japanese Utility Model Laying-Open No. 63-185917

Patent Document 13: Japanese Patent Laying-Open No. 2002-194438

Patent Document 14: Japanese Patent Laying-Open No. 5-179350

Patent Document 15: U.S. Pat. No. 4,727,832, specification

Patent Document 16: Japanese Patent Laying-Open No. 62-007908

Patent Document 17: Japanese Patent Laying-Open No. 5-321616

Patent Document 18: Japanese Patent Laying-Open No. 3-031503

Patent Document 19: Japanese Utility Model Laying-Open No. 3-063703

DISCLOSURE OF THE INVENTION

Problems to be Solved by the Invention

It is predicted that, regarding a rolling bearing for a rocker arm used for opening/closing an intake valve or exhaust valve of an engine, as any usual bearing, the speed and load in use will increase and a lubricating oil will decrease in viscosity in the future. The life of a bearing used under these conditions is determined by those factors including the usual load-dependent rolling fatigue life and additionally the surface damage life depending on metal contact caused by sliding and loss of an oil film. In order to extend the life of the rocker arm rolling bearing, these lives have to be extended. However, no technique has been developed that dramatically extends both of the lives. Further, there is also a problem of a shortened life due to roller interference and skew that are inherent in the full-type rolling bearing.

The techniques that have been known mainly improve the rolling life by an increased hardness and an increased compression stress or improve a rolling surface for associated components. These techniques actually applied to the bearing are evaluated to show that they are effective for fatigue strength of an outer ring for example in such a use in which bending is exerted and effective for the wear resistance of the outer circumferential surface of the outer ring, thereby providing favorable results. However, with the techniques only, it is not necessarily effective in extending the rolling fatigue life of the shaft corresponding to the inner ring of the bearing as well as rollers.

Accordingly, a first object of the present invention is to provide a rolling bearing for a rocker arm having an extended life. Further, a second object of the present invention is to provide a rolling bearing for a rocker arm used for opening/closing an intake valve or exhaust valve of an engine, extended in rolling fatigue life as well as surface damage life against surface damage due to metal contact, under conditions in use of increased speed and load as well as decreased viscosity of the lubricating oil.

Moreover, in recent years, the variable valve lift mechanism or the variable valve timing mechanism is employed and thus the valve mechanism becomes more complicated. Further, it is required to decrease the weight of movable components and the engine itself. For these reasons, the space to be occupied by the rocker arm in the valve mechanism has become limited. Therefore, it is also required that the rolling bearing integrated into the rocker arm is also made compact as compared with conventional ones.

However, if the rocker arm rolling bearing is made compact, the load exerted per unit area increases, leading to a problem of a shortened life. Therefore, it has not been achieved to make the rocker arm rolling bearing compact and prevent the life from shortening.

Therefore, a third object of the present invention is to provide a rolling bearing for a rocker arm that can be made compact and prevented from being shortened in life.

Moreover, as described above, it is also required to make lightweight and compact the bearing for the rocker arm used for opening/closing an intake valve or an exhaust valve of the engine. However, as seen from the above, improvements have not been achieved for the crack fatigue strength of a hollow cylindrical inner ring.

Therefore, a fourth object of the present invention is to provide a rolling bearing for a rocker arm that is used for opening/closing an intake valve or exhaust valve of an engine, that has an inner ring in the shape of a hollow cylinder and thereby satisfies the requirements for lightweight and compactness, and that is improved in crack fatigue strength and rolling fatigue life.

Means for Solving the Problems

According to a first aspect of the present invention, a rolling bearing for a rocker arm includes: an outer ring in rolling contact with a camshaft of an engine; an inner ring placed inside the outer ring and fixed to the rocker arm; and a plurality of rolling elements provided between the outer ring and the inner ring. At least one member among the outer ring, the inner ring and the rolling elements has a nitrogen-rich layer, an austenite crystal grain size number in a range exceeding 10 and a surface hardness Hv of at least 653.

Austenite grains of the member are made fine to have a grain size number exceeding 10, so that the rolling fatigue life can be improved remarkably. If the austenite grain size number is 10 or smaller, the rolling fatigue life is not considerably improved, and thus the grain size number is set to a range larger than 10. Usually, the grain size number is preferably at least 11. Further, the average crystal grain size may be at most 6 μm. Although it is desirable that the austenite grain size is smaller, it is usually difficult to obtain a grain size number exceeding 13.

The austenite crystal grain size may be determined by a usual method defined by the JIS, or the average grain size corresponding to the crystal grain size number may be determined by the intercept method for example and then converted. The above-described austenite crystal grain size number may be satisfied in the nitrogen-rich layer. However, usually, the steel body located inside the carbonitrided layer also satisfies the standard of making austenite crystal grains finer.

The austenite crystal grains refer to crystal grains of austenite that is phase-transformed during quench heating and refer to those remaining in the form of past history, even after transformed into martensite by cooling. In addition, "inner ring" herein includes a solid shaft and a hollow shaft.

Moreover, the surface hardness Hv is 653 or higher so that the rolling fatigue life can be improved remarkably. If the surface hardness Hv is lower than 653, the life under a contaminant-mixture condition shortens. Preferably, the surface hardness Hv is at least 720 and at most 800. Although a higher surface hardness Hv is desirable, if the surface hardness Hv exceeds 800, the carbide is likely to be larger and could become a site of stress-concentration.

(a1) The rocker arm may be pivotably attached to a pivot shaft placed between one end and the other end of the rocker arm. An end portion of an open/close valve of the engine may abut on that one end, the rocker arm may have, at its other end, a bifurcated inner-ring support portion, and the inner ring of the rocker arm rolling bearing of the present invention may be fixed to the bifurcated inner-ring support portion.

(a2) Further, the rocker arm rolling bearing may be provided between one end and the other end of the rocker arm, the inner ring may be fixed in an inner-ring hole extending between two sidewalls of the rocker arm, an end portion of an open/close valve of the engine may abut on that one end of the rocker arm, and a pivot may abut on the other end of the rocker arm.

(a3) Furthermore, the rocker arm may have a rocker arm body and an interlocking rod transmitting a stress from the camshaft, the rocker arm body may be pivotably attached to a pivot shaft placed between one end and the other end of the rocker arm body, an end portion of an open/close valve of the engine may abut on that one end of the rocker arm body, one end portion of the interlocking rod may abut on that one end of the rocker arm body, and the inner ring of the rolling bearing of the present invention may be fixed to the other end portion of the interlocking rod.

While the rocker arms according to (a1), (a2) and (a3) above have a common feature that they transmit a driving force from the cam to the valve of the engine, they are different in structure and thus adaptable to different engine types respectively.

Moreover, the rocker arm rolling bearing may be a full-type needle bearing.

According to a second aspect of the present invention, a rolling bearing for a rocker arm includes: a shaft corresponding to an inner ring fixed to the rocker arm provided between a valve and a cam of an engine to adjust intake air and exhaust air; an outer ring placed outside the inner ring and contacting the cam; and a plurality of rolling elements placed between the outer ring and the inner ring. At least one of the outer ring, the inner ring and the rolling elements has a nitrogen-rich layer, an austenite crystal grain size number of the nitrogen-rich layer is in a range exceeding 10, and an amount of retained austenite of the nitrogen-rich layer is, in a surface layer of 50 μm of a rolling surface after grinding, in a range of 11% by volume to 25% by volume.

The shaft corresponding to the inner ring may be solid shaft or hollow shaft. These shafts corresponding to the inner ring are referred to as inner ring.

The austenite crystal grains of the outer ring, inner ring or rolling elements do not change in the surface layer portion where the nitrogen-rich layer is present and an inner portion located inside relative to the surface layer portion. Therefore, the position where the range of the austenite crystal grain size number should be satisfied is the surface layer portion and/or inner portion. Here, as for the austenite crystal grains, the trace of the austenite crystal grain boundary immediately before quenching still remains even after the quenching is performed, and thus the austenite crystal grains refer to crystal grains based on the trace. The grain size number can be measured in accordance with the JIS standard for example as described in connection with embodiments.

Regarding the structure according to the second aspect of the present invention, it is supposed that the amount of retained austenite is 11% by volume or higher. Then, even if stress and/or distortion is applied to the extent that causes a local damage, the retained austenite is transformed into martensite to increase the volume and thus a compression stress is generated to prevent any damage. Therefore, the surface damage life is improved. If the amount of retained austenite is lower than 11%, the surface damage life is improved to a small degree. In contrast, if the amount of retained austenite is higher than 25% by volume, the amount of retained austenite is not so different from that in the case where usual carbonitriding is performed. Accordingly, the volume is excessively increased while the retained austenite is transformed into martensite, resulting in an increase in secular dimensional change, which is not preferable. Therefore, the retained austenite is 11% by volume to 25% by volume, more preferably in a range of 15% by volume to 25% by volume.

The amount of retained austenite of 11% by volume to 25% by volume or 15% by volume to 25% by volume is the value in the surface layer portion of the rolling surface after grinding.

Further, preferably the nitrogen content of the nitrogen-rich layer is in a range of 0.1% by weight to 0.7% by weight. The nitrogen-rich layer refers to a layer that is formed in a surface layer of the outer ring, the inner ring or the rolling elements and that has a higher nitrogen content. The nitrogen-rich layer can be formed, for example, by such a process as carbonitriding, nitriding, nitriding. Preferably the nitrogen content of the nitrogen-rich layer is in a range of 0.1% by weight to 0.7% by weight. If the nitrogen content is lower than 0.1% by weight, it is less effective for generation of retained austenite and increase in hardness for example, and particularly the surface damage life shortens. If the nitrogen content is higher than 0.7% by weight, a hole called void is generated, or the amount of retained austenite is excessive, resulting in insufficient hardness and shorter life. The nitrogen content of the nitrogen-rich layer is the value in the surface layer portion of the rolling surface after grinding. The nitrogen content may alternatively be called the ratio of the contained nitrogen.

(b1) Regarding the rocker arm rolling bearing, the rocker arm may be pivotably supported on a pivot shaft placed between one end and the other end of the rocker arm, the one end may have a bifurcated inner-ring support portion, the inner ring may be fixed to the bifurcated inner-ring support portion, and an end portion of a valve of the engine may abut on the other end.

(b2) Further, regarding the rocker arm rolling bearing, an end portion of a valve of the engine may abut on one end of the rocker arm, a pivot may be fitted to the other end thereof, and the inner ring may be fixed in an inner-ring hole of two opposing sidewalls between the one end and the other end of the rocker arm.

(b3) Furthermore, regarding the rocker arm rolling bearing, the rocker arm may be pivotably supported on a pivot shaft placed between one end and the other end of the rocker arm, an end portion of a valve of the engine may abut on the one end, an end portion of an interlocking rod transmitting a stress from the camshaft may abut on the other end, the inner ring of the rocker arm bearing may be fixed to the other end portion of the interlocking rod, and the outer ring may contact the cam.

While the combinations of the rocker arm and the rolling bearing according to (b1), (b2) and (b3) above have a common feature that they transmit a driving force from the cam to the valve of the engine, they are different in structure and thus adaptable to different engine types respectively.

According to a third aspect of the present invention, a rocker arm rolling bearing includes: an outer ring in rolling contact with a camshaft of an engine; an inner ring placed inside the outer ring and fixed to the rocker arm; and a plurality of rolling elements provided between the outer ring and the inner ring, and all of the outer ring, the inner ring and the rolling elements have a nitrogen-rich layer. The nitrogen-rich layer of at least one of the inner ring and the rolling elements has an austenite crystal grain size number in a range exceeding 10, an amount of retained austenite of the at least one of the inner ring and the rolling elements is at least 11% by volume and at most 25% by volume, and nitrogen content of the at least one of the inner ring and the rolling elements is at least 0.1% by mass and at most 0.7% by mass.

The austenite crystal grains do not change in the surface layer portion where the nitrogen-rich layer is present and an inner portion located inside relative to the surface layer portion. Therefore, the position where the range of the crystal grain size number should be satisfied is the surface layer portion and the inner portion. Here, the austenite crystal grains refer to crystal grains of austenite that is phase-transformed during quench heating and refer to those remaining in the form of past history, even after transformed into martensite by cooling.

If the amount of retained austenite is lower than 11% by volume, the surface damage life tends to considerably shorten. If the amount of retained austenite is higher than 25% by volume, the amount of retained austenite is not so different from that in the case where usual carbonitriding is performed, resulting in deterioration in secular dimensional change.

The amount of retained austenite is the value in a surface layer of 50 μm of the rolling surface after grinding, and can be measured for example by means of the X-ray diffraction method by comparing the diffraction intensity of martensite α (211) with that of retained austenite γ (220). Alternatively, based on the fact that the austenite phase is nonmagnetic while the ferrite phase is ferromagnetic, the magnetizing force may be determined by a magnetic balance or the like. Alternatively, any commercially available measuring device can be used to take a measurement easily.

The nitrogen-rich layer is a layer that is formed in a surface layer and that has a higher nitrogen content. The nitrogen-rich layer can be formed by such a process as carbonitriding, nitriding, nitriding. If the nitrogen content of the nitrogen-rich layer is lower than 0.1% by mass, there is no effect and particularly the surface damage life shortens. If the nitrogen content is higher than 0.7% by mass, a hole called void is generated, or the amount of retained austenite is excessive, and thus the hardness is insufficient, resulting in a shorter life. The nitrogen content of the nitrogen-rich layer is the value in a surface layer of 50 μm of the rolling surface after grinding. The nitrogen content can be measured for example by EPMA (Electron Probe Micro-Analysis: waveform-dispersive X-ray micro-analyzer).

As seen from the above, the rolling bearing for the rocker arm of the present invention can achieve a longer life. Therefore, even if the bearing is made compact, the life is not shorter than that of the conventional one. Thus, while compactness is achieved, shortening of the life can be prevented.

(c1) The rocker arm may be attached to a rocker arm shaft placed between one end and the other end of the rocker arm. An end portion of an open/close valve of the engine may abut on that one end, the rocker arm may have, at the other end, a bifurcated inner-ring support portion, and the inner ring of the rocker arm rolling bearing of the present invention may be fixed to the bifurcated inner-ring support portion.

(c2) Further, between one end and the other end of the rocker arm, the rocker arm rolling bearing of the present invention may be provided. The inner ring may be fixed in an inner-ring hole extending between two sidewalls of the rocker arm, an end portion of an open/close valve of the engine may abut on the one end of the rocker arm, and a pivot may abut on the other end of the rocker arm.

(c3) Furthermore, the rocker arm may have a rocker arm body and an interlocking rod transmitting a stress from the camshaft. The rocker arm body may be attached to a rocker arm shaft placed between one end and the other end of the rocker arm, an end portion of an open/close valve of the engine may abut on the one end of the rocker arm body, one end portion of the interlocking rod may abut on the one end of the rocker arm body, and the inner ring of the rocker arm rolling bearing of the present invention may be fixed to the other end portion of the interlocking rod.

Although the rocker arms according to (c1), (c2) and (c3) above have a common feature that they transmit a driving force from the cam to the valve of the engine, they are different in structure and thus adaptable to different engine types respectively.

"Inner ring" herein includes a solid shaft and a hollow shaft.

According to a fourth aspect of the present invention, a rolling bearing for a rocker arm includes: an outer ring in rolling contact with a camshaft of an engine; an inner ring placed inside the outer ring and fixed to the rocker arm; and a plurality of rolling elements provided between the outer ring and the inner ring. At least one member of members that are the outer ring, the inner ring and the rolling elements has a nitrogen-rich layer, the member having the nitrogen-rich layer has an austenite crystal grain size number in a range exceeding 10, and the member having the nitrogen-rich layer has an area ratio of a spherical carbide of at least 10%.

The austenite crystal grain size may be determined by a usual method defined by the JIS, or the average grain size corresponding to the crystal grain size number may be determined by the intercept method for example and then converted. The austenite crystal grain size number may be satisfied in a carbonitrided layer. However, usually, the steel body located inside relative to the carbonitrided layer also satisfies the standard of making austenite crystal grains finer.

The austenite crystal grains refer to crystal grains of austenite that is phase-transformed during quench heating and refer to those remaining in the form of past history, even after transformed into martensite by cooling. In addition, "inner ring" herein includes a solid shaft and a hollow shaft.

Since the area ratio of the spherical carbide of the member containing the nitrogen-rich layer is 10% or higher, the rolling fatigue life can be improved remarkably. If the area ratio of the spherical carbide is lower than 10%, the rolling fatigue life is not considerably improved, and thus the range of at least 10% is employed. A higher area ratio of the spherical carbide is desirable. However, usually, if the area ratio is higher than 25%, increased size and agglomeration of the carbide cause deterioration of the material toughness. Therefore, a desirable range is at least 10% and at most 25%.

(d1) The rocker arm may be pivotably attached to a pivot shaft placed between one end and the other end of the rocker arm, an end portion of an open/close valve of the engine may abut on the one end, the rocker arm may have, at the other end, a bifurcated inner-ring support portion, and the inner ring of the rocker arm rolling bearing of the present invention may be fixed to the bifurcated inner-ring support portion.

(d2) Further, the rocker arm rolling bearing may be provided between one end and the other end of the rocker arm, the inner ring may be fixed in an inner-ring hole extending between two sidewalls of the rocker arm, an end portion of an open/close valve of the engine may abut on the one end of the rocker arm, and a pivot may abut on the other end of the rocker arm.

(d3) Furthermore, the rocker arm may have a rocker arm body and an interlocking rod transmitting a stress from the camshaft. The rocker arm body may pivotably attached to a pivot shaft placed between one end and the other end of the rocker arm body, an end portion of an open/close valve of the engine may abut on the one end of the rocker arm body, one end portion of the interlocking rod may abut on the one end of the rocker arm body, and the inner ring of the rolling bearing of the present invention may be fixed to the other end portion of the interlocking rod.

While the rocker arms according to (d1), (d2) and (d3) above have a common feature that they transmit a driving force from the cam to the valve of the engine, they are different in structure and thus adaptable to different engine types respectively.

Moreover, the rocker arm rolling bearing may be a full-type needle bearing:

According to a fifth aspect of the present invention, a rolling bearing for a rocker arm includes: an outer ring in rolling contact with a camshaft of an engine; an inner ring placed inside the outer ring; and a plurality of rolling elements provided between the outer ring and the inner ring. The inner ring is made of a steel containing at least 0.50% by mass of carbon, has a hollow cylindrical shape, has an end surface with a hardness of at least HV 200 and at most HV 300, and has a hardened layer extending entirely in the radial direction from a rolling surface of the inner ring where the rolling elements roll to an inner circumferential surface of the inner ring.

Regarding the rocker arm rolling bearing according to the fifth aspect of the present invention, the hardened layer is formed entirely in the radial direction from the rolling surface of the inner ring where the rolling elements roll to the inner circumferential surface of the inner ring, so that the static crack strength and the crack fatigue strength can be improved. Further, since the inner ring has a hollow cylindrical shape, the rolling bearing can be made lightweight and compact.

As for the carbon content of the steel of which the inner ring is made, at least 0.5% by mass of carbon is necessary for providing, by high-frequency induction heating, an appropriate hardness (at least HV 653) of the outer circumferential surface of the inner ring where rolling elements or rollers roll.

The end surface of the inner ring is caulked to be fixed to the rocker arm for example, the end surface of the inner ring has a hardness in a range of at least HV 200 and at most HV 300 so that it can be caulked.

Regarding the rocker arm rolling bearing according to the fifth aspect of the present invention, preferably a surface layer portion of the rolling surface of the inner ring has an austenite crystal grain size number in a range exceeding 10, and the austenite crystal grain size number is the value in a surface layer of 50 μm of the rolling surface after grinding.

Since the austenite crystal grain size number is larger than 10 and thus the austenite crystal grain size is very small, the rolling fatigue life can be improved remarkably. If the austenite crystal grain size number is less than 10, the crack fatigue strength and rolling fatigue life are not dramatically improved. Therefore the austenite crystal grain size number larger than 10 is employed, and usually 11 or larger is employed.

Here, regarding the austenite crystal grains, the trace of the austenite crystal grain boundary immediately before quenching remains even after the quenching, and thus the austenite crystal grains refer to crystal grains based on the trace.

Regarding the rocker arm rolling bearing according to the fifth aspect of the present invention, preferably the inner ring has a surface layer portion containing a nitrogen-rich layer.

Regarding the rocker arm rolling bearing according to the fifth aspect of the present invention, preferably a surface layer portion of a rolling surface of the inner ring has an amount of retained austenite of at least 11% by volume and at most 40% by volume, and the amount of retained austenite is the value in a surface layer of 50 μm of the rolling surface after grinding.

If the amount of retained austenite is approximately 11% by volume, the surface damage life tends to shorten and tends to further shorten if the amount of retained austenite is lower than 11% by volume. In contrast, if the amount of retained austenite is higher than 40% by volume, the surface hardness decreases to cause deterioration of the rolling fatigue life.

Regarding the rocker arm rolling bearing according to the fifth aspect of the present invention, preferably the nitrogen content of the nitrogen-rich layer is in a range of at least 0.1% by mass and at most 0.7% by mass, and the nitrogen content is the value in a surface layer of 50 μm of the rolling surface after grinding.

The nitrogen-rich layer is a layer that is formed in a surface layer of the inner ring and that has a higher nitrogen content. The nitrogen-rich layer can be formed by such a process as carbonitriding, nitriding, nitriding. If the nitrogen content of the nitrogen-rich layer is lower than 0.1% by mass, no effect is obtained and particularly the surface damage life shortens. If the nitrogen content is higher than 0.7% by mass, a hole called void could be generated, or an excessive amount of retained austenite is contained and thus the hardness could be insufficient, resulting in a shortened life.

Regarding the rocker arm rolling bearing according to the fifth aspect of the present invention, preferably the rolling surface of the inner ring has a hardness of at least HV 653.

The high surface hardness of at least HV 653 can remarkably improve the rolling fatigue life. If the surface hardness is lower than HV 653, the rolling fatigue life is not considerably improved but rather deteriorated. Usually, the range of the surface hardness is at least HV 720 and at most HV 800. Although a higher surface hardness is desirable, usually a surface hardness higher than HV 900 is difficult to achieve.

Regarding the rocker arm rolling bearing according to the fifth aspect of the present invention, preferably the nitrogen-rich layer of the surface layer portion of the rolling surface of the inner ring has an area ratio of a spherical carbide of at least 10%, and the area ratio of the spherical carbide is a value in a surface layer of 50 μm of the rolling surface after grinding.

The area ratio of the spherical carbide of at least 10% can remarkably improve the rolling fatigue life. If the area ratio of the spherical carbide is lower than 10%, the rolling fatigue life is not considerably improved. Therefore, at least 10% is employed. Although a higher area ratio of the spherical carbide is desirable, usually the area ratio exceeding 25% causes increased size and agglomeration of the carbide to deteriorate the material toughness. Therefore, the area ratio is desirably in a range of at least 10% and at most 25%. The area ratio of the spherical carbide is a value in a surface layer of 50 μm of the rolling surface after grinding, and can be observed by an optical microscope (×400) after corrosion by means of picric acid in alcohol (picral).

Although the term spherical carbide is used for simplification, actually it is a combination of a carbide and a nitride.

Such features as the amount of retained austenite, the nitrogen content of the nitrogen-rich layer, the hardness of the hardened layer and the area ratio of the spherical carbide contribute to a greater degree to improvement of the crack strength of the inner ring, as compared to their contribution to the rolling fatigue life.

(e1) Regarding the rolling bearing used for the rocker arm, preferably the rocker arm is attached to a rocker arm shaft placed between one end and the other end of the rocker arm, a bifurcated inner-ring support portion is provided at the one end of the rocker arm, an end portion of an open/close valve of the engine abuts on the other end, and the inner ring is fixed to the bifurcated inner-ring support portion.

(e2) Regarding the rolling bearing used for the rocker arm, preferably a pivot abuts on the one end of the rocker arm, the rolling bearing is provided between the one end and the other end of the rocker arm, and an end portion of an open/close valve of the engine abuts on the other end.

(e3) Regarding the rolling bearing used for the rocker arm, preferably the rocker arm is attached to a rocker arm shaft placed between one end and the other end of the rocker arm, one end portion of an interlocking rod transmitting a force from the cam shaft abuts on the one end of the rocker arm, an end portion of an open/close valve of the engine abuts on the other end, and the rolling bearing is provided at the other end portion of the interlocking rod.

While the manners according to (e1), (e2) and (e3) above have a common feature that they transmit a driving force from the cam to the valve of the engine, they are different in structure and thus adaptable to different engine types respectively.

Regarding the rocker arm rolling bearing, preferably the rocker arm rolling bearing is a full-type needle bearing.

Effects of the Invention

The rolling bearing for the rocker arm according to the first aspect of the present invention has austenite grains that are made fine to have a grain size number exceeding 10, and has a surface hardness Hv of at least 653. Therefore, the rolling fatigue life is remarkably improved, and an excellent anti-crack strength and an excellent anti-secular-dimensional-change can be achieved.

The rolling bearing for the rocker arm according to the second aspect of the present invention can have, under the conditions in use of an increased speed, an increased load and a decreased viscosity of a lubricating oil, a longer rolling fatigue life as well as a longer surface damage life depending on a surface damage due to metal contact.

The rolling bearing for the rocker arm according to the third aspect of the present invention can be made compact and prevented from shortening the life.

The rolling bearing for the rocker arm according to the fourth aspect of the present invention has austenite grains that are made fine to have a grain size number exceeding 10, and an area ratio of a spherical carbide of at least 10%, so that the rolling fatigue life is remarkably improved and thus excellent anti-crack strength and anti-secular-dimensional-change can be achieved.

The rolling bearing for the rocker arm according to the fifth aspect of the present invention has the hardened layer formed entirely in the radial direction from the rolling surface of the inner ring where rolling elements roll to the inner circumference, so that the static crack strength and the crack fatigue strength can be improved. Further, since the inner ring has a hollow cylindrical shape, the rolling bearing can be made lightweight and compact. Furthermore, the rolling bearing has the surface layer portion including the nitrogen-rich layer, has austenite crystal grains that are made fine to have a grain size number exceeding 10, has an appropriate amount of retained austenite, has an appropriate surface hardness, and has a high area ratio of the spherical carbide. Therefore, both of the usual load-dependent rolling fatigue life as well as the surface damage life depending on the metal contact due to sliding and missing oil film can be improved.

DESCRIPTION OF THE REFERENCE SIGNS 1 rocker arm, 1a, 1b end of rocker arm, 1c sidewall, 2, 52 outer-ring shaft (inner ring), 2a hardened layer, 2b outer circumferential surface, 2c inner circumferential surface, 2d end surface, 3, 53 rollers (needle rollers), 4, 54 outer ring, 5 rocker arm shaft (pivot shaft), 6 cam, 7 adjust screw, 8 locknut, 9 valve, 9a upper end of valve, 10 spring, 11 rocker-arm body, 11a, 11b end of rocker arm body, 14 inner-ring support portion (outer-ring support portion), 15 pivot hole, 16 interlocking rod, 16a bearing attachment portion, 16b upper end of interlocking rod, 17 attachment member, 50 rolling bearing, 55, 56 member, 101 drive roll, 111 drive roll, 112 guide roll, 113 ball, 121 specimen for rolling fatigue life test

BEST MODES FOR CARRYING OUT THE INVENTION

In the following, embodiments of the present invention are described according to the drawings.

First Embodiment

Figure 1:
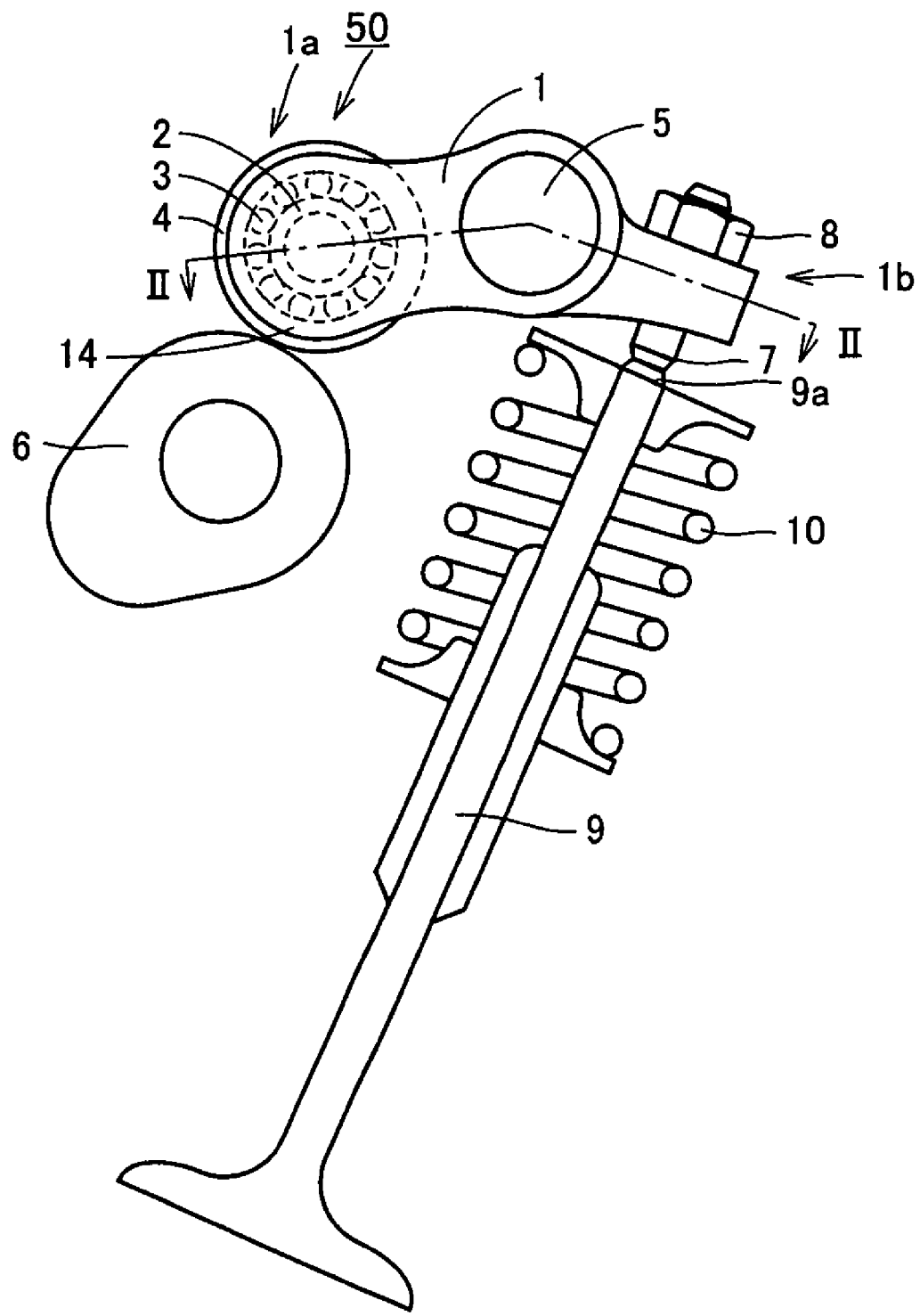
FIG. 1 is a schematic front view of a rocker arm rolling bearing in use, according to a first embodiment of the present invention.
Figure 2:
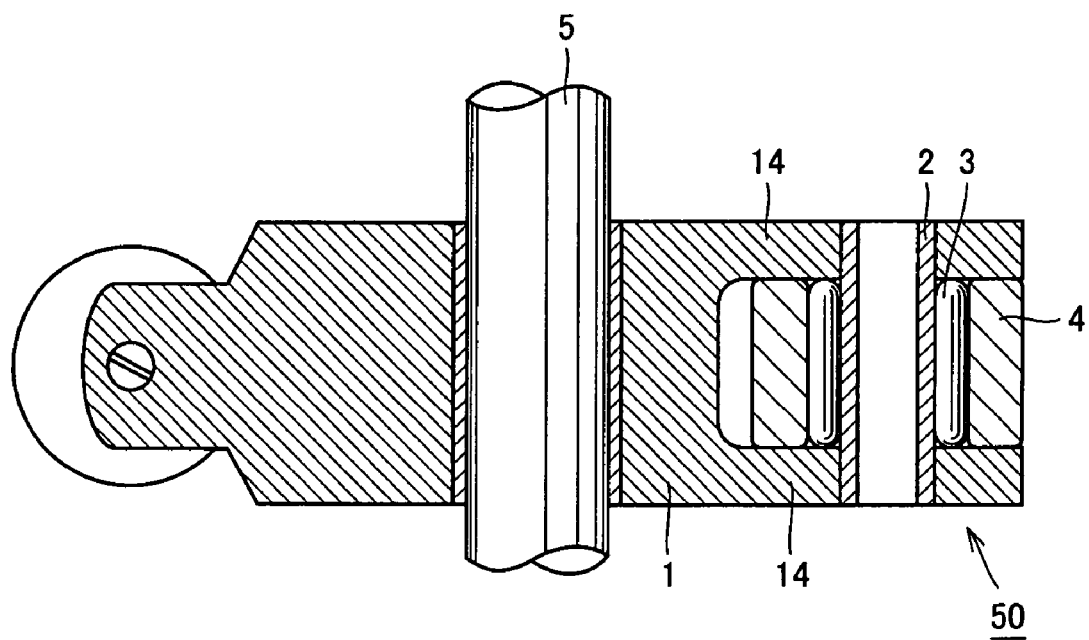
FIG. 2 is a cross-sectional view along a line II-II in FIG. 1.

FIG. 1 is a schematic front view showing a rolling bearing for a rocker arm in use, according to a first embodiment of the present invention. FIG. 2 is a cross-sectional view along a line II-II in FIG. 1. Referring to FIGS. 1 and 2, rocker arm 1 that is a pivot member is pivotably supported, at a central portion located between one end 1a and the other end 1b, on a rocker arm shaft 5 via a bearing metal for example. Rocker arm 1 swings about rocker arm shaft 5.

Rocker arm 1 has one end 1b into which an adjust screw 7 is screwed. Adjust screw 7 is fastened by a lock nut 8 and has its lower end that abuts on an upper end 9a of an intake valve or exhaust valve of an internal combustion engine (open/close valve of an engine) 9. Valve 9 is biased by an elastic force of a spring 10.

Rocker arm 1 has the other end 1a where a bifurcated inner-ring support portion (outer-ring support portion) 14 is integrated. In an outer-ring shaft hole opened in this bifurcated inner-ring support portion 14, both ends of an outer-ring shaft 2, which corresponds to an inner ring, are fixed by caulking, press-fit or a snap ring. Outer-ring shaft 2 has a hollow cylindrical shape. On a central portion of the outer peripheral surface of outer-ring shaft 2, an outer ring 4 is rotatably supported via a plurality of rollers 3 serving as rolling elements. In other words, between outer-ring shaft 2 and outer ring 4, a plurality of rollers 3 are provided. Namely, at this bifurcated outer-ring support portion 14, a full-type rolling bearing (needle bearing) 50 having an outer-ring shaft 2 corresponding to the inner ring, rollers 3 that are rolling elements and outer ring 4 is disposed. The axial direction of rollers 3 is disposed in parallel with the axial line of outer-ring shaft 2. The outer peripheral surface of outer ring 4 abuts on a cam surface of a cam 6 provided on a camshaft, by the biasing force of spring 10. In other words, cam 6 and an outer ring 4 are in rolling contact with each other.

As cam 6 rotates, rocker arm 1 is pushed by cam 6 to vibrate in the up-and-down direction, and the vibration is transmitted to valve 9 with rocker arm shaft 5 serving as a fulcrum to cause valve 9 to open/close. Rocker arm rolling bearing 50 of the present embodiment is a full-type rolling bearing without cage, and is comprised of outer-ring shaft 2, a plurality of rollers 3 and outer ring 4. Rocker arm rolling bearing 50 serves to reduce friction between rocker arm 1 and cam 6 and thereby improve wear resistance. Since rocker arm rolling bearing 50 rotates while contacting cam 6, a pressing force and an impact force of cam 6 are exerted on outer ring 4.

Figure 3:
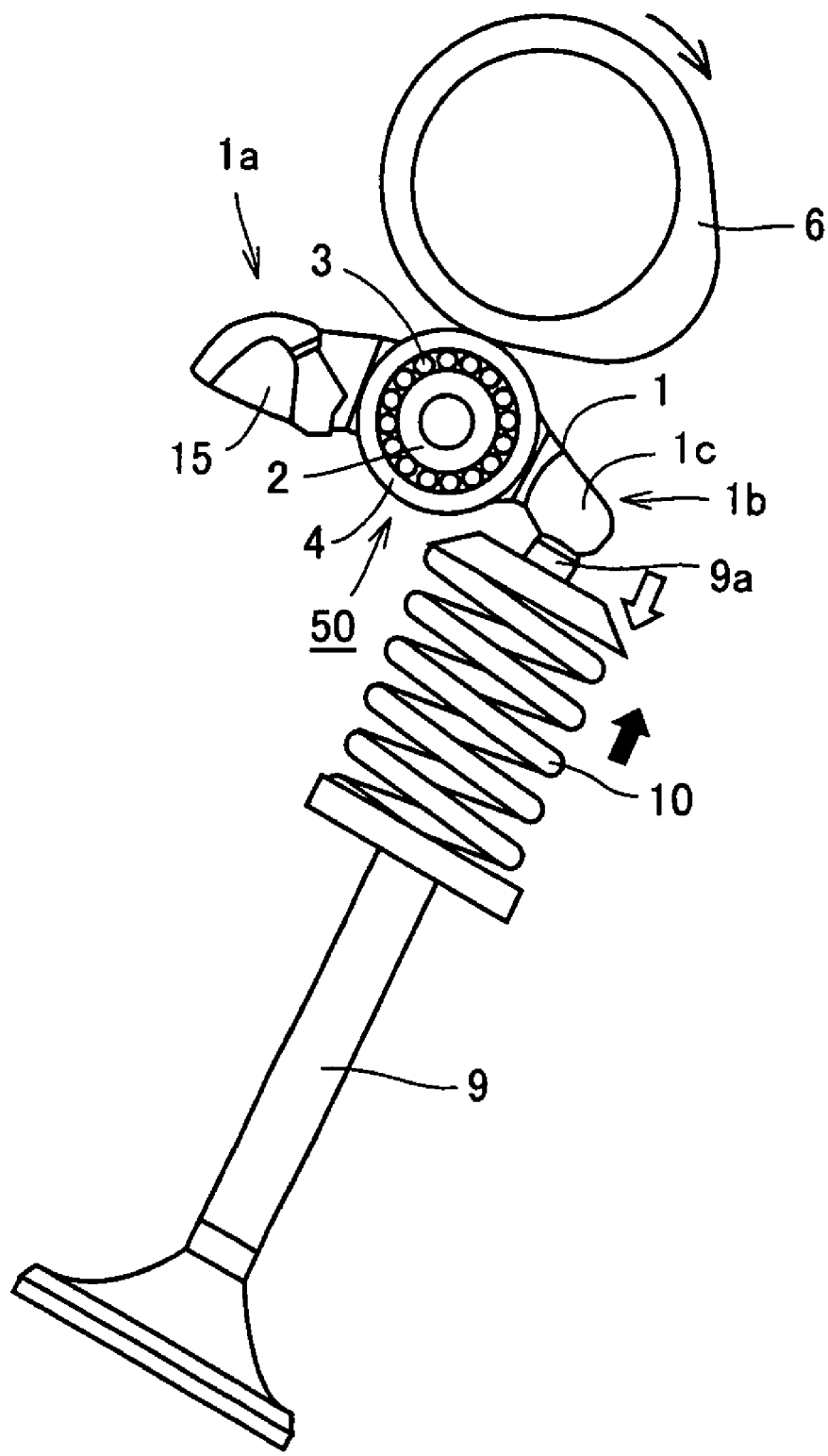
FIG. 3 is a schematic front view of another rocker arm rolling bearing in use, according to the first embodiment of the present invention.

FIG. 3 is a schematic front view of another rocker arm rolling bearing in use, according to the first embodiment of the present invention. Referring to FIG. 3, between one end 1b and the other end 1a of rocker arm 1, rocker arm rolling bearing 50 is provided. Further, from one to the other of two sidewalls 1c of rocker arm 1, an outer-ring hole (not shown) serving as an inner-ring hole is formed. In this outer-ring hole, an outer-ring shaft 2 is fixed.

Outer-ring shaft 2 has a hollow cylindrical shape, and has both ends that are inserted into outer-ring shaft holes (not shown) formed in respective sidewalls on both sides of rocker arm 1, and caulked to be fixed. On a central portion of the outer peripheral surface of outer-ring shaft 2, outer ring 4 is rotatably supported via rollers 3. The axial direction of rollers 3 is disposed in parallel with the axial line of outer-ring shaft 2. The outer circumferential surface of outer ring 4 abuts on a cam surface of cam 6 provided on the camshaft, by a biasing force of spring 10.

Further, on one end 1b of rocker arm 1, upper end 9a of open/close valve 9 of an engine abuts. In the other end 1a of rocker arm 1, a pivot hole 15 is provided. Pivot hole 15 abuts on a pivot (not shown). Rocker arm 1 having pivot hole 15 is biased by spring 10 in a predetermined direction about the pivot. A driving force transmitted from cam 6 is received by outer ring 4 to move valve 9 against the biasing force of spring 10.

Figure 4:
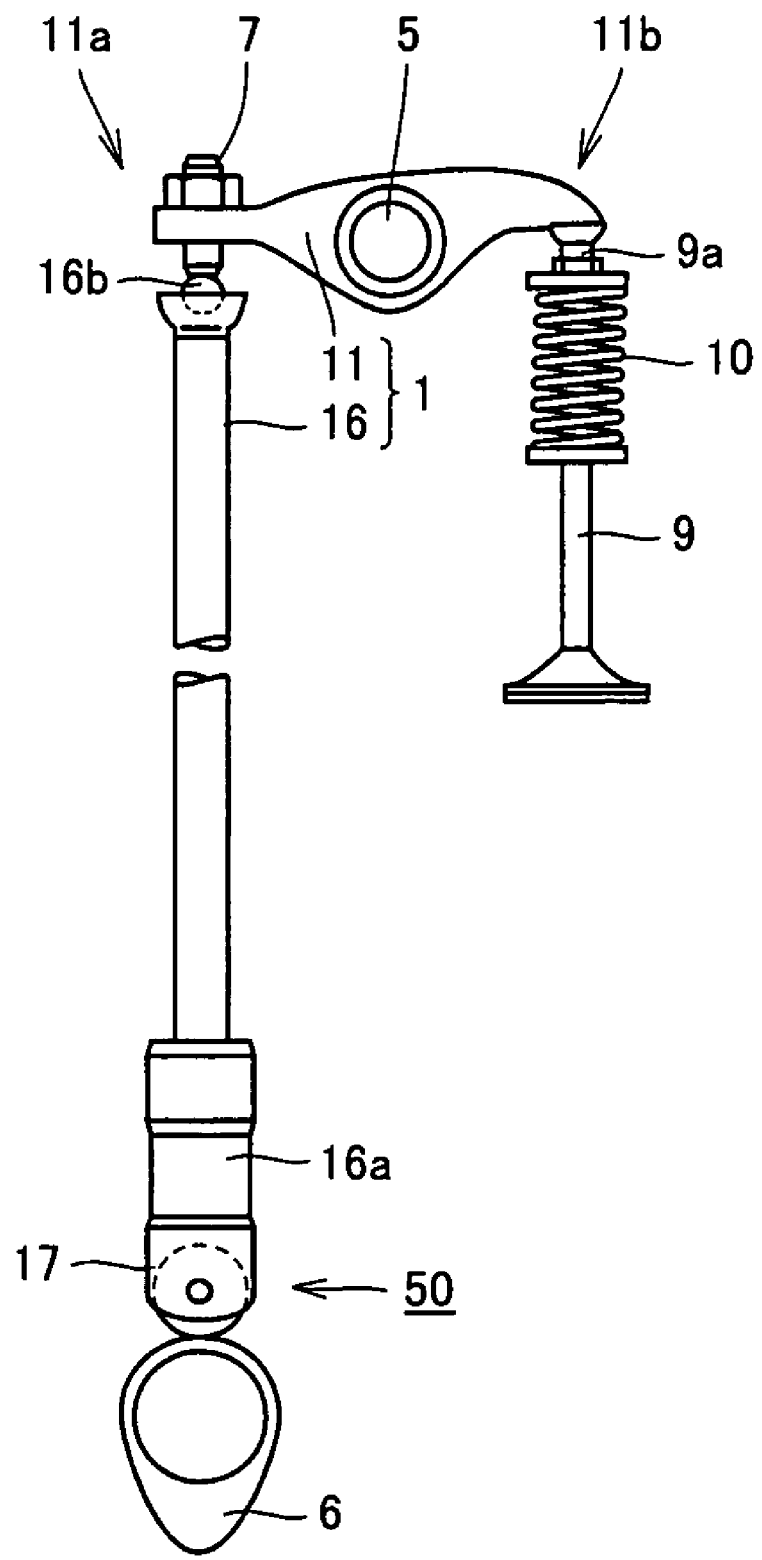
FIG. 4 is a schematic front view of still another rocker arm rolling bearing in use, according to the first embodiment of the present invention.
Figure 5:
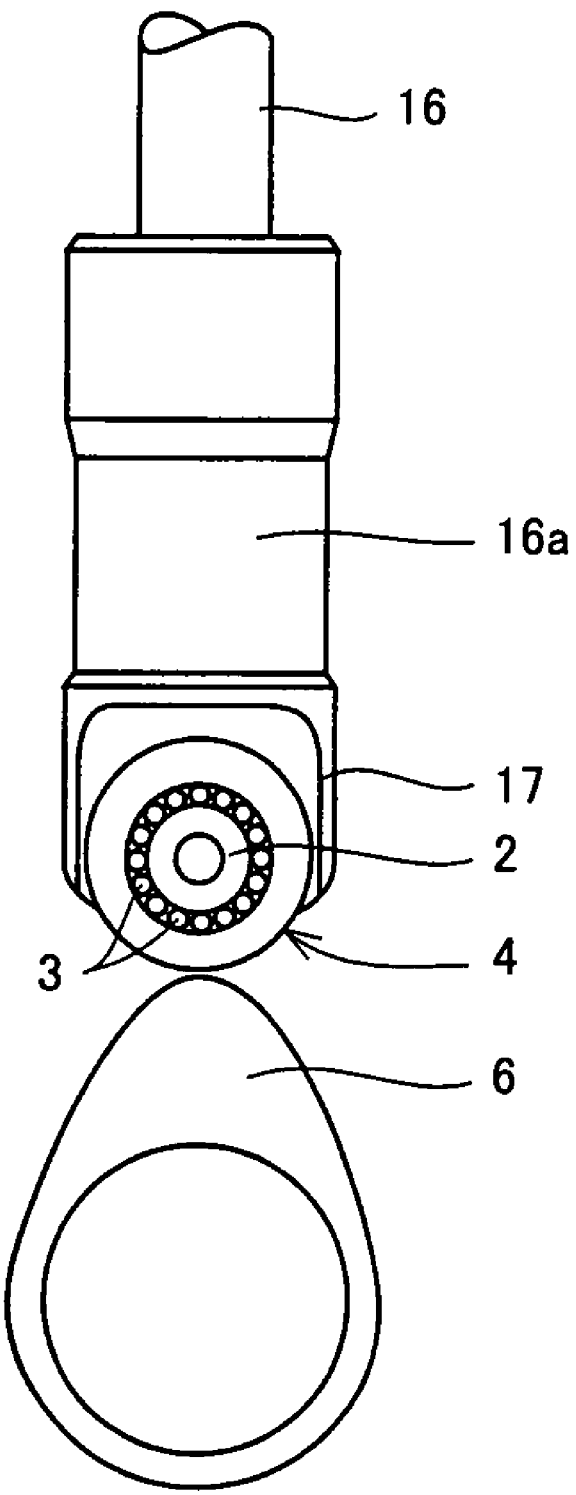
FIG. 5 is an enlarged view of a portion including the rocker arm rolling bearing in FIG. 4.

FIG. 4 is a schematic front view of still another rocker arm rolling bearing in use, according to the first embodiment of the present invention. FIG. 5 is an enlarged view of a portion including the rocker arm rolling bearing in FIG. 4.

Referring to FIGS. 4 and 5, rocker arm 1 has a rocker arm body 11 and an interlocking rod 16 transmitting a stress from cam 6. Between one end 11b and the other end 11a of rocker arm body 11, namely at a central portion of rocker arm body 11, a rocker arm shaft (pivot shaft) 5 is disposed, about which rocker arm body 11 pivots. On one end 11b of rocker arm body 11, upper end 9a of valve 9 abuts, and valve 9 is biased by an elastic force of spring 10. On the other end 11a of rocker arm body 11, an upper end 16b of interlocking rod 16 abuts. To the other end 11a of rocker arm body 11, adjust screw 7 is attached. Adjust screw 7 has the capability of adjusting the position where rocker arm body 11 and interlocking rod 16 abut on each other. To a hollow bearing attachment portion 16a located on the lower end of interlocking rod 16, outer-ring shaft 2 of rocker arm rolling bearing 50 is attached by an attachment member 17. Cam 6 abuts on outer ring 4 of rocker arm rolling bearing 50 to transmit the driving force to interlocking rod 16.

Rolling bearing 50 includes outer-ring shaft 2 corresponding to an inner ring, rollers 3 that are rolling elements, and outer ring 4. Outer-ring shaft 2 has a hollow cylindrical shape. Both ends of outer-ring shaft 2 are caulked to be fixed to attachment member 17. On a central portion of the outer peripheral surface of outer-ring shaft 2, outer ring 4 is rotatably supported via rollers 3. The axial direction of rollers 3 is disposed in parallel with the axial line of outer-sing shaft 2.

The outer circumferential surface of outer ring 4 is allowed to abut on a cam surface of cam 6 by a biasing force of spring 10. Cam 6 abuts on outer ring 4 of this rolling bearing 50 to transmit the driving force to interlocking rod 16. This interlocking rod 16 transmits the driving force of the camshaft having cam 6 to rocker arm 1.

It is noted that "one" and "the other" used herein in connection with FIGS. 1 to 5 are not particularly distinguished from each other. It is merely intended that an end described earlier herein is referred to as "one" end.

Of constituent members of rocker arm rolling bearing 50 as described above, at least one of the members: rollers 3, outer-ring shaft 2 and outer ring 4, is heat-treated by low-temperature secondary quenching as described in the following so as to make austenite grains fine. As a result, at least one of outer-ring shaft 2 which is the inner ring, rollers 3 which are rolling elements and outer ring 4 in FIGS. 1 to 5 described above has a nitrogen-rich layer, and a surface-layer portion of the member is induction-hardened to have ultrafine austenite grains having an austenite crystal grain size number of at least 11 (defined by the JIS standard) and a hardness of at least HV 653.

Further, of the constituent members of the rocker arm rolling bearing, at least one of the members: rollers 3, outer-ring shaft 2 and outer ring 4 is heat-treated by low-temperature secondary quenching as described in the following to provide an austenite crystal grain size number in a range of more than 10, and an amount of retained austenite of a nitrogen-rich layer is in a range of 11% to 25% by volume in a surface-layer portion of a rolling surface after grinding.

Furthermore, of the constituent members of rocker arm rolling bearing 50, all of outer ring 4, outer-ring shaft 2 and rollers 3 have a nitrogen-rich layer. Further, at least one of the members: outer-ring shaft 2 and rollers 3, is heat treated by low-temperature secondary quenching as described below, so that at least one of outer-ring shaft 2 and rollers 3 has a nitrogen-rich layer with an austenite crystal grain size number in a range of more than 10, an amount of retained austenite in a range of 11% to 25% by volume, and a nitrogen content of 0.1% to 0.7% by mass.

Moreover, of the constituent members of rocker arm rolling bearing 50, at least one of the members: rollers 3, outer-ring shaft 2 and outer ring 4, is heat-treated by low-temperature secondary quenching as described hereinlater to have an austenite crystal grain size number in a range of more than 10, and an area ratio of a spherical carbide of at least 10%.

Figure 6:
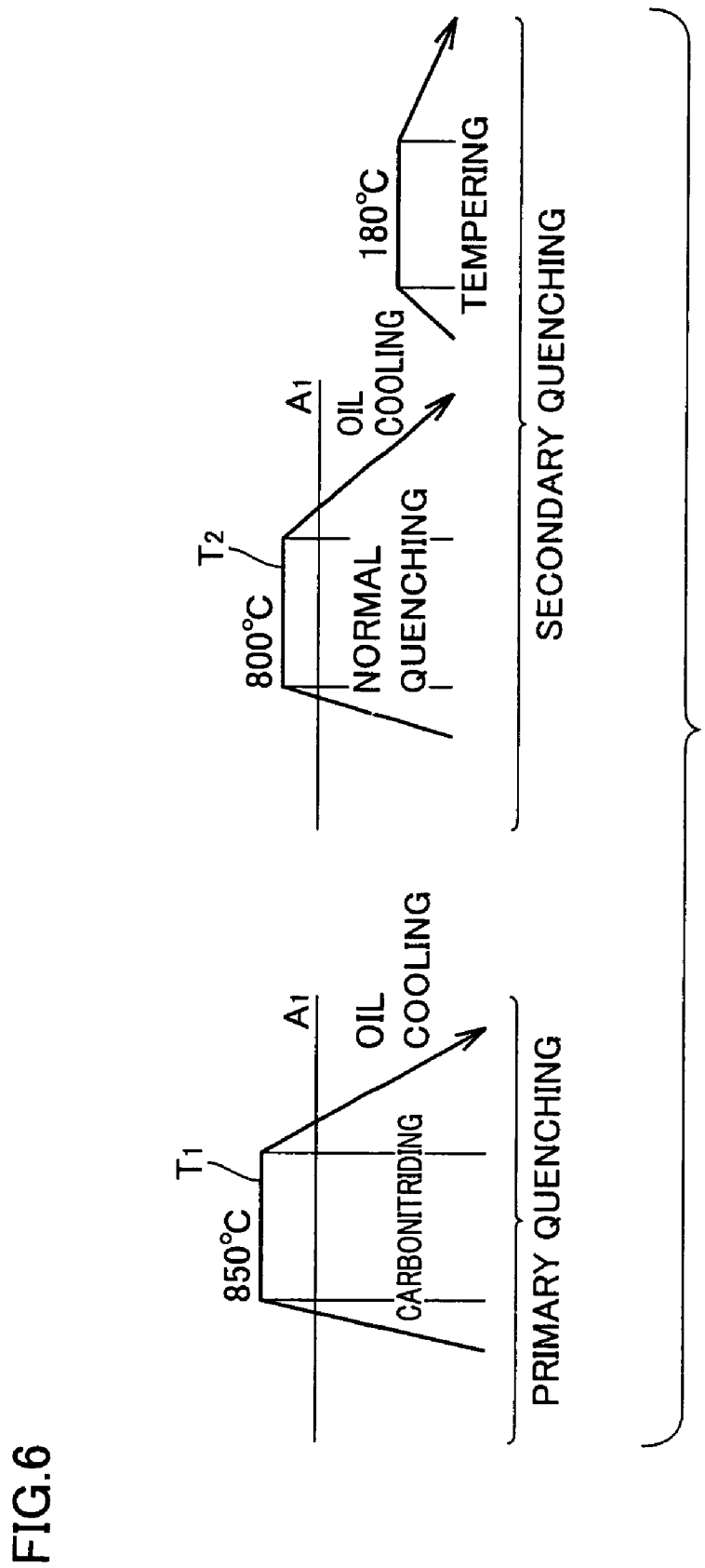
FIG. 6 illustrates a heat treatment method according to the first embodiment of the present invention.
Figure 7:
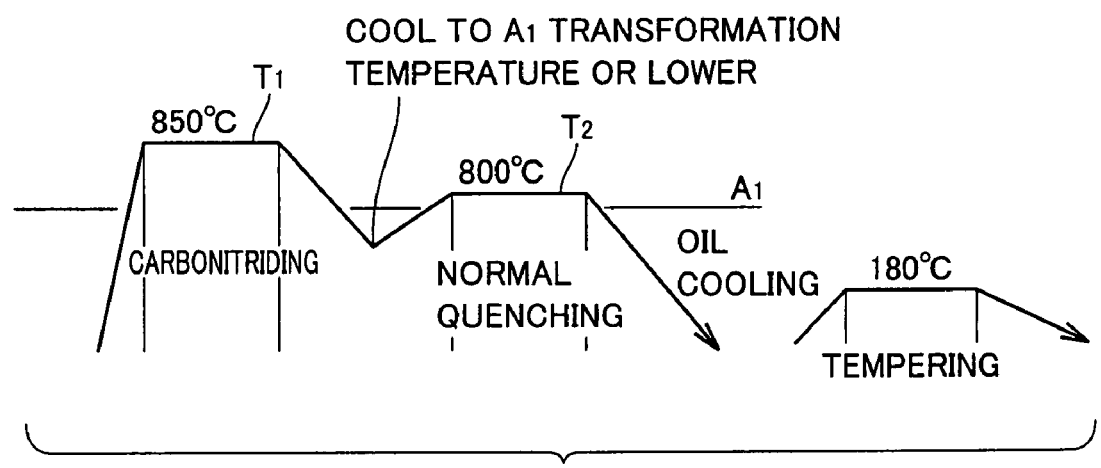
FIG. 7 illustrates a modification of the heat treatment method according to the first embodiment of the present invention.

A description is now given of the heat treatment including carbonitriding that is performed on at least one of the bearing components: outer ring (4), inner ring (outer-ring shaft 2) and rolling elements (rollers 3) of the rolling bearing. FIG. 6 illustrates a heat treatment method according to the first embodiment of the present invention. FIG. 7 illustrates a modification of the heat treatment method of the first embodiment of the present invention. FIG. 6 is a heat-treatment pattern showing the method according to which primary quenching and secondary quenching are performed, and FIG. 7 is a heat-treatment pattern showing the method according to which a material is cooled to a temperature lower than an $A_1$ transformation temperature in the process of quenching, and thereafter re-heating the material to finally accomplish quenching. These are both embodiments of the present invention. In these drawings, in a process $T_1$, carbon and nitrogen are diffused through a steel matrix while the carbon is sufficiently dissolved therein, and thereafter cooling is done to a temperature lower than the $A_1$ transformation temperature. Then, in a process $T_2$ in the drawings, heating is done again to a temperature lower than that in process $T_1$ and then oil-quenching is performed.

From a comparison between the above-described heat treatment and normal quenching, namely carbonitriding subsequently followed by quenching which is performed once, it is seen that the above-described heat treatment can further improve the crack strength and further reduce the rate of secular dimensional change while carbonitriding the surface layer portion. As described above, the above-described heat treatment method can provide a microstructure in which the grain size of austenite crystal grains is a half or less of the conventional one. A bearing component that is heat-treated as described above can have a long rolling fatigue life, improved crack strength and reduced rate of secular dimensional change.

Figure 8:
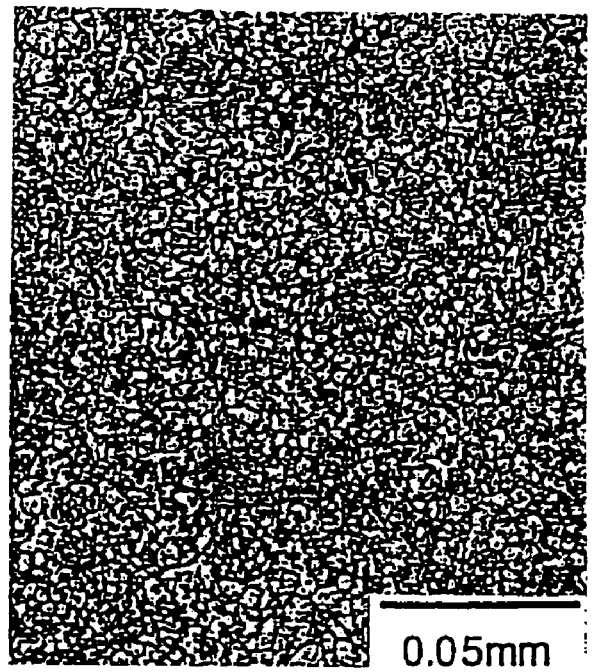
FIG. 8 shows a microstructure of a bearing component, particularly austenite grains. (a) shows a bearing component of the present invention and (b) shows a conventional bearing component.
Figure 8:
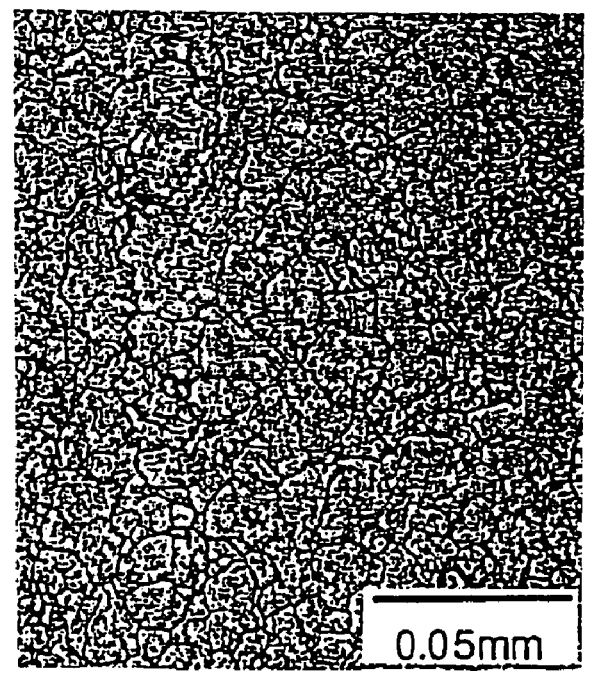
Figure 9:
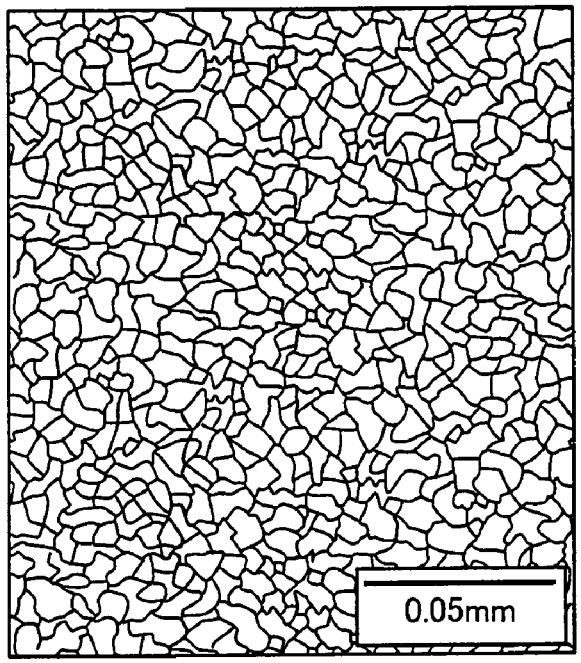
FIG. 9(a) diagrammatically shows boundaries of austenite grains in FIG. 8(a), and FIG. 9(b) diagrammatically shows boundaries of austenite grains in FIG. 8(b).
Figure 9:
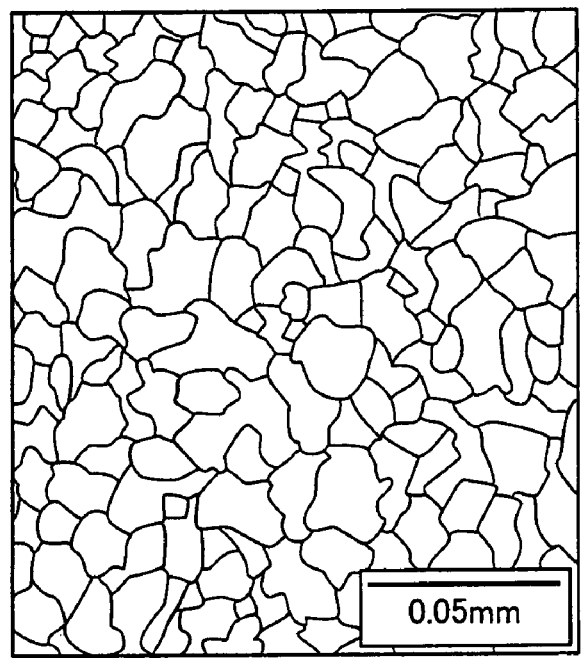

FIG. 8 shows a microstructure of a bearing component, particularly austenite grains. FIG. 8(*a*) shows a bearing component of the present invention and FIG. 8(*b*) shows a conventional bearing component. Namely, FIG. 8(*a*) shows the austenite crystal grain size of a bearing steel to which the heat treatment pattern shown in FIG. 6 is applied. For comparison, FIG. 8(*b*) shows the austenite crystal grain size of a bearing steel to which the convention heat treatment method is applied. Further, FIG. 9(*a*) and FIG. 9(*b*) diagrammatically show austenite crystal grain boundaries of FIG. 8(*a*) and FIG. 8(*b*). Regarding the structures having these austenite crystal grain sizes, the conventional austenite grain size is at most 10 in grain size number defined by the JIS standard, and the heat treatment method of the present invention can provide fine grains having a grain size number of 12. Further, the average grain size in FIG. 8(*a*) was 5.6 μm as measured by the intercept method.

Second Embodiment

Figure 11:
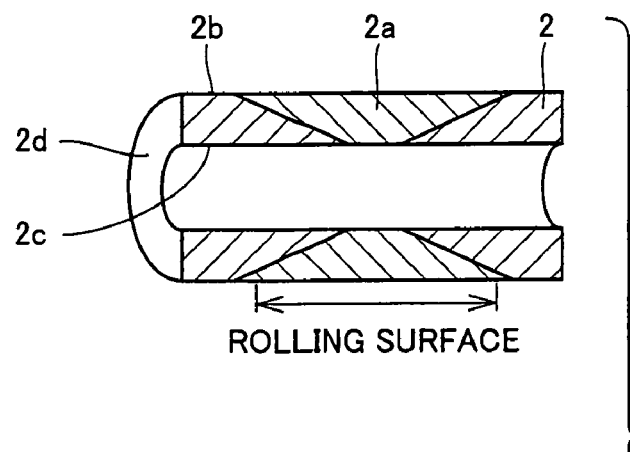
FIG. 11 is a perspective cross-sectional view illustrating a hardened-layer pattern according to a second embodiment of the present invention.
Figure 11:
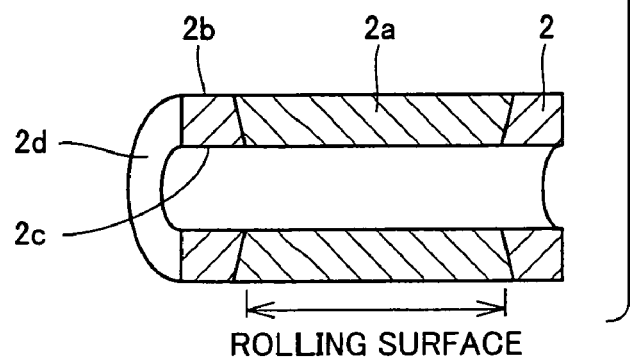

Referring to FIGS. 1 to 5, inner ring 2 of rocker arm rolling bearing 50 in the present embodiment is made of a steel containing at least 0.50% by mass of carbon, has a hollow cylindrical shape and has a hardness of at least HV 200 and at most HV 300 at its end surface. Further, inner ring 2 of each rolling bearing 50 has, as shown in FIGS. 11(*a*), (*b*), a hardened layer extending entirely in the radial direction from a rolling surface of inner ring 2 where rollers (rolling elements) 3 roll to an inner circumferential surface 2*c*. Preferably, such a hardened layer is formed entirely in the circumferential direction of inner ring 2.

Figure 10:
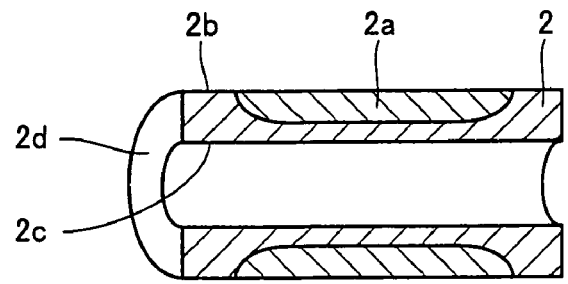
FIG. 10 is a perspective cross-sectional view illustrating a conventional hardened-layer pattern.

As a pattern of this hardened layer, Japanese Patent Laying-Open No. 2000-38906 discloses the one as shown in FIG. 10. Only a surface layer portion of the rolling surface of an outer circumferential surface 2*b* of inner ring 2 is a hardened layer 2*a*, and a surface layer portion of inner circumferential surface 2*c* and a surface layer portion of an end surface 2*d* are unhardened layer. In the case of this pattern of hardened layer 2*a*, under a load exerted on the bearing, inner ring 2 including a mixture of hardened layer 2*a* and the unhardened layer has a smaller strength and thus easily deform, as compared with inner ring 2 in which hardened layer 2*a* is entirely formed, and consequently a large tensile stress is generated in a central portion of inner circumferential surface 2*c*. If a load is repeatedly applied, even a small tensile stress causes cracks, often resulting in breakage of the inner ring, since the surface layer portion of inner circumferential surface 2*c* is unhardened layer and thus has a smaller fatigue strength as compared with hardened layer 2*a*.

In contrast, referring to FIG. 11(*a*), (*b*), in the case of the pattern of hardened layer 2*a* in the present embodiment, the region from the surface layer of the rolling surface of outer circumferential surface 2*b* of inner ring 2 to inner circumferential surface 2*c* is entirely hardened layer 2*a*, and only the surface layer portion and therearound of end surface 2*d* is the unhardened layer. In the case of this pattern of hardened layer 2*a*, the region of hardened layer 2*a* is larger than that of inner ring 2 shown in FIG. 10, and thus has a larger strength and is less likely to deform. Further, even if a load is repeatedly exerted, crack can be prevented from generating and the possibility of breakage of inner ring 2 is reduced, since the central portion of inner circumferential surface 2*c* is hardened layer 2*a* to have a larger fatigue strength.

The hardened-layer pattern of FIG. 11(*b*) is more desirable than that of FIG. 11(*a*), since the region of hardened layer 2*a* along inner circumferential surface 2*c* is larger, and is thus advantageous in terms of strength. Further, the pattern preventing crack generation in the larger region along inner circumferential surface 2*c*, against tensile stress generated due to repeatedly applied load, is more advantageous than the pattern preventing crack in only the central portion along inner circumferential surface 2*c*, also in the case where a biased load is exerted due to unstable behavior of rocker arm 1.

Further, hardened layer 2*a* has a hardness of at least HV 653, and the unhardened layer including end surface 2*d* of inner ring 2 has a hardness of at least HV 200 and at most HV 300. Between hardened layer 2*a* and the unhardened layer, an intermediate layer (hardness: at least HV 300 and at most HV 653) is present.

Furthermore, preferably inner ring 2 has a nitrogen-rich layer in its surface layer, and the surface layer is induction-hardened to be made ultrafine having an austenite crystal grain size number exceeding 10 (defined by the JIS standard).

The rolling surface of inner ring 2 has a surface hardness of at least HV 653. Preferably, since the surface layer of inner ring 2 is induction-hardened, the amount of retained austenite is at least 11% by volume and at most 40% by volume. Still preferably, the nitrogen content of the nitrogen-rich layer is at least 0.1% by mass and at most 0.7% by mass. Here, the amount of retained austenite and the nitrogen content are numerical values in the surface layer of 50 μm of the rolling surface after grinding. Thus, in the surface layer portion, both of surface damage and inside-originated peeling are unlikely to occur. In contrast, other portions have a lower hardness and thus is easily caulked. Therefore, although not shown, both ends of the outer-ring shaft are caulked to form a caulked fix portion in a chamfered portion of an outer-ring shaft support portion.

A description is first given of heat treatment including carbonitriding performed on inner ring 2 of rolling bearing 50.

Figure 12:
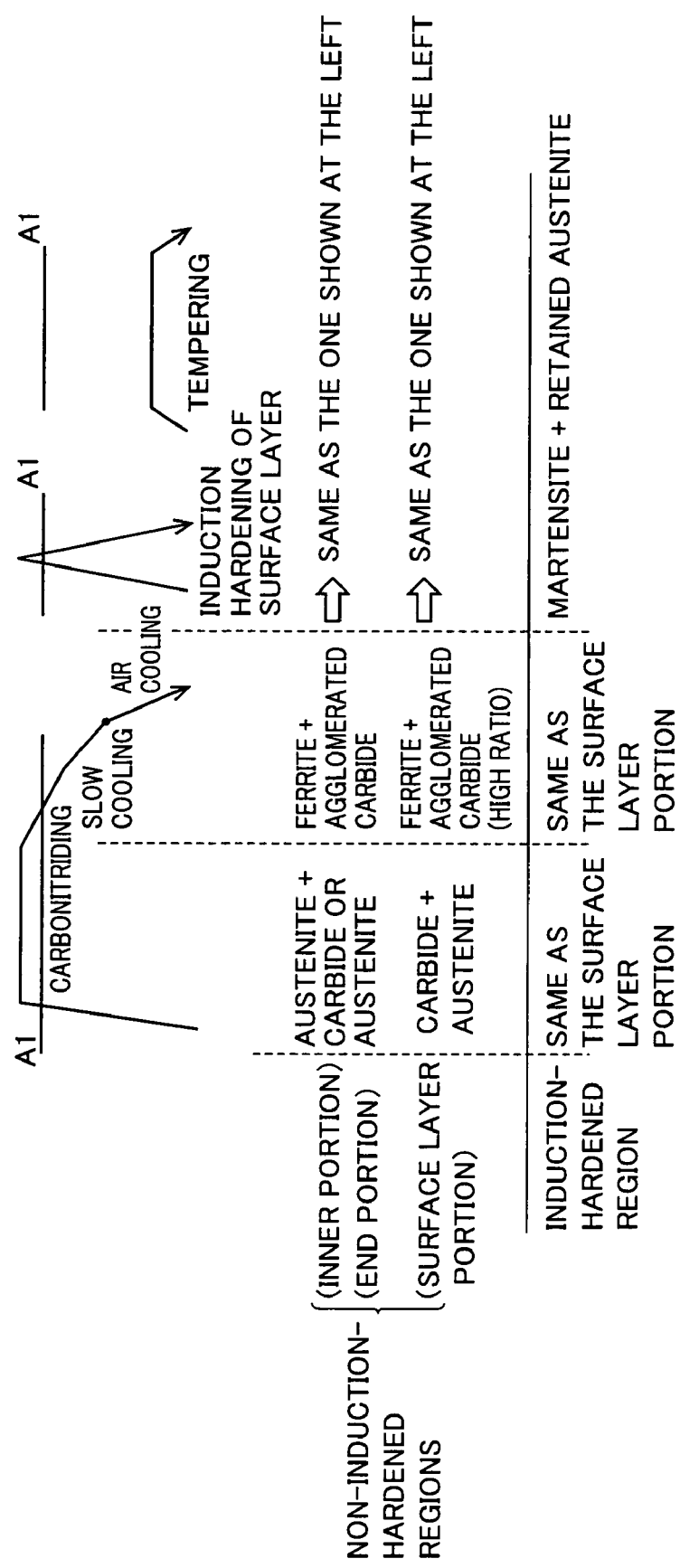
FIG. 12 illustrates a heat treatment method according to the second embodiment of the present invention.
Figure 13:
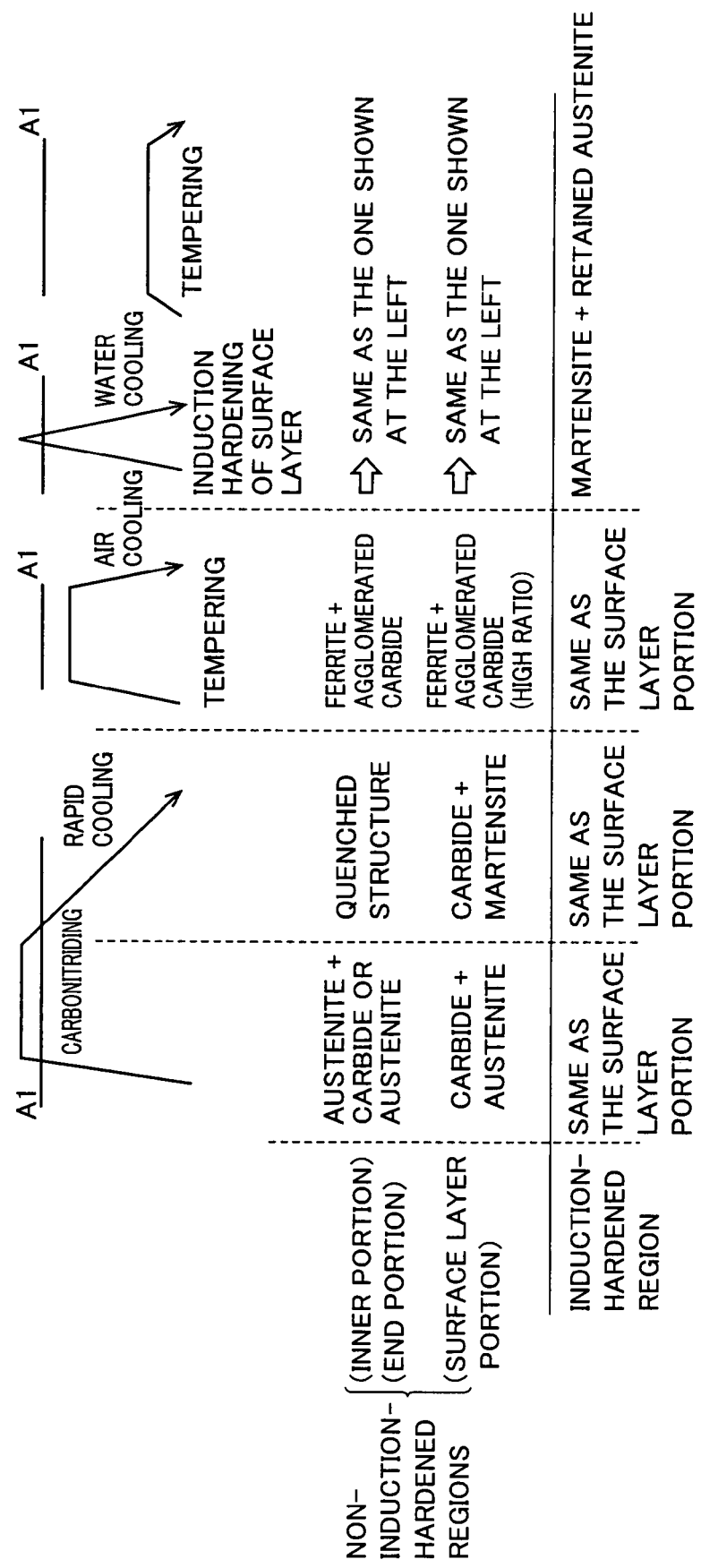
FIG. 13 illustrates another heat treatment method according to the second embodiment of the present invention.

FIG. 12 illustrates a heat treatment method according to the second embodiment of the present invention. FIG. 13 illustrates another heat treatment method according to the second embodiment of the present invention. FIG. 12 shows a heat treatment pattern according to which carbonitriding is performed at a temperature of at least the A1 temperature and directly thereafter slow cooling is performed. FIG. 13 shows a heat treatment pattern according to which carbonitriding is performed at a temperature of at least the A1 temperature, thereafter rapid cooling is performed, and then tempering is performed at a temperature lower than the A1 temperature. The slow cooling of the heat treatment pattern in FIG. 12 and the tempering in FIG. 13 correspond to each other, contributing to lowering the hardness in a portion except for the surface layer portion. Both of the heat treatment patterns in FIGS. 12 and 13 subsequently apply induction hardening to the surface layer portion including the rolling surface, and thereafter apply low-temperature tempering.

A description is next given about how a microstructure is generated in each of the processes in FIGS. 12 and 13. First, both of the heat patterns in FIGS. 12 and 13 perform, on a steel material made of a steel containing at least 0.50% by mass of carbon and having a hollow cylindrical shape, carbonitriding at a temperature of at least the A1 temperature for example. In this carbonitriding process, a nitrogen-rich layer is formed in the subject member (inner ring) of the rolling bearing. In this nitrogen-rich layer, C, N that are interstitial elements for iron atoms Fe enter an eutectoid steel and a carbide is precipitated in austenite for example (two-phase coexistence). In other words, the nitrogen-rich layer is a hypereutectoid steel. Further, in the inner portion that is not carbonitrided, the composition of the original steel which is the raw material has an austenite phase. Moreover, the carbonitriding may be performed at a temperature at which the two phases of ferrite and austenite or two phases of austenite and cementite coexist in the steel which is the raw material.

In the subsequent cooling, the heat pattern in FIG. 12 (referred to as heat pattern H1) performs slow cooling from the temperature of the carbonitriding. An object of this slow cooling is to soften the structure and improve workability. During the slow cooling, in the inner portion, pearlite which is a mixture of ferrite and cementite is generated from the austenite. The cementite in the pearlite is not made lamellar, but agglomerated into a larger mass, to promote the softening. Therefore, the temperature range of the slow cooling may be approximately from the carbonitriding temperature to (A1 temperature-100° C.). Slow cooling to a lower temperature cannot agglomerate and thereby make large the cementite, while a considerable time is consumed and the efficiency is deteriorated. The temperature may be lowered to approximately 620° C. After this, air cooling may be performed for saving time or alternatively water cooling or oil cooling may be performed.

In the nitrogen-rich layer, from the austenite (carbide+austenite), pearlite is generated and the carbide therein is agglomerated into a larger mass.

Regarding the heat pattern in FIG. 13 (referred to as heat pattern H2), from the carbonitriding temperature, quenching is performed by oil cooling for example. In this case, in an inner portion, the composition of the original steel material generates martensite from austenite. The martensite structure is hard. Since caulking of the material as it is difficult, the above-described tempering is performed. Tempering rapidly proceeds at a temperature immediately below the A1 temperature and as close as possible to the A1 temperature. In other words, high-temperature tempering is performed. Therefore, it is desirable that the tempering is done in a temperature range of the A1 temperature to 650° C., or more preferably in a range of the A1 temperature to 680° C. Through the tempering, a high dislocation density in the martensite structure is removed, so that a structure including ferrite with a low dislocation density and the agglomerated large cementite can be obtained.

In the carbonitrided layer, martensite is generated from austenite (carbide+austenite) by quenching through oil cooling for example. The martensite is also softened through the tempering as the martensite generated in the inner portion. The original carbide is agglomerated.

In the above description of the microstructure, for the purpose of easy understanding, nitrogen and secondary factors of more complicated actual microstructure are not referred to.

Then, regarding both of heat patterns H1 and H2, induction hardening is performed. In the preceding stage of the induction hardening, the nitrogen-rich layer is a structure in which the agglomerated carbide (high ratio) and ferrite are mixed. In the induction hardening process, rapid heating is performed. At this time, carbide is dissolved while nucleus of crystal of austenite is generated. Since the density of dispersed carbide is very high, the density at which the nucleus of crystal of the austenite is generated is also very high. The generated austenite particles meet each other to generate an austenite structure having ultrafine crystal grains. Further, since the nitrogen-rich layer is the hypereutectoid steel, carbide is also contained and this carbide hinders growth of just-generated and thus ultrafine austenite grains. Therefore, in the nitrogen-rich layer, ultrafine austenite grains can be obtained. As the temperature of the rapid heating becomes higher, carbide is dissolved and a large amount of carbon is dissolved in the ultrafine austenite.

Subsequent quenching after the rapid heating transforms the ultrafine austenite into martensite. Here, since a large amount of carbon is dissolved, the austenite is made stable, and untransformed austenite is left in very small regions between martensite grains. This is retained austenite. Since the retained austenite is generated between martensite grains, the retained austenite is very fine. On the basis of percentage by volume, the retained austenite is 11 to 40% by volume.

After this, at approximately 180° C., tempering is performed to the extent that does not considerably lower the hardness. With the tempering at approximately 180° C., high-density dislocation is not eliminated but substantially maintained. The tempering is applied for the purpose of making the structure stable. This tempering does not cause agglomeration of cementite and causes substantially no softening. Depending on the steel material, the tempering may not be performed.

The induction-hardened structure containing the retained austenite is strong and thus can have a long life under severe conditions in use.

Through the above-described heat treatment, the surface layer portion can contain ultrafine austenite grains with the austenite grain size number of at least 11 (in a range exceeding 10), and the microstructure of the inner portion can be a mixed structure of ferrite and carbide. Further, the surface layer portion can have a hardness of at least HV 635, and retained austenite of 11 to 40% by volume. As shown in FIG. 11(*a*) or (*b*), the hardened layer (hardness: at least HV 635) can be formed entirely in the radial direction from the rolling surface to the inner circumferential surface of the inner ring.

In contrast, the unhardened layer (including the end surfaces of the inner ring) except for the hardened layer can have a hardness of at least HV 200 and at most HV 300. Therefore, the inner ring heat-treated as describe above has a long rolling fatigue life and is easy to caulk.

Further, the nitrogen-rich layer can have a nitrogen content of at least 0.1% by mass and at most 0.7% by mass, and the area ratio of the spherical carbide in the nitrogen-rich layer can be at least 10%.

A description is then given of specific conditions of heat patterns H1, H2 shown in FIGS. 12 and 13.

Figure 14:
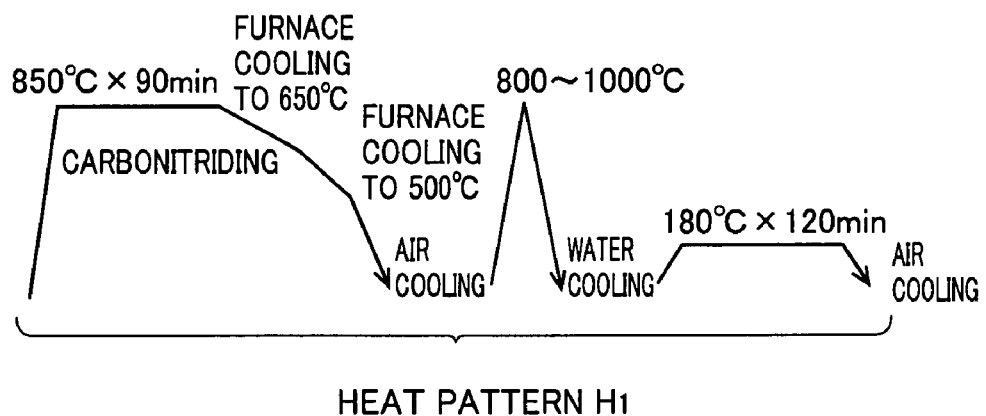
FIG. 14 shows a heat pattern H1 in FIG. 12 to which specific conditions are additionally indicated.
Figure 15:
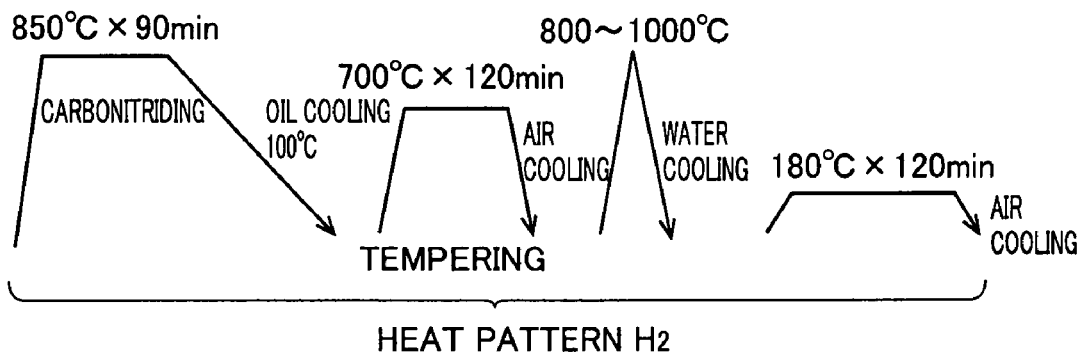
FIG. 15 shows a heat pattern H2 in FIG. 13 to which specific conditions are additionally indicated.

FIG. 14 shows heat pattern H1 in FIG. 12 to which specific conditions are additionally indicated, and FIG. 15 shows heat pattern H2 in FIG. 13 to which specific conditions are additionally indicated. Referring to FIG. 14, the carbonitriding is performed under the conditions for example of 850° C.×90 minutes. The slow cooling following the carbonitriding is performed for example by furnace cooling from the carbonitriding temperature to 650° C., subsequent furnace cooling from 650° C. to 500° C. and subsequent air cooling. The induction hardening is performed for example by the rapid heating to 800° C. to 1000° C. and subsequent water cooling. The tempering is performed for example under the conditions of 180° C.×120 minutes and subsequent air cooling.

Referring to FIG. 15, the carbonitriding is performed for example under the conditions of 850° C.×90 minutes. After the carbonitriding, oil cooling is used for example for cooling to 100° C. The tempering is performed for example under the conditions of 700° C.×120 minutes and subsequent air cooling. The induction hardening is performed for example by the rapid heating to 800 to 1000° C. and subsequent water cooling. The tempering is performed for example under the conditions of 180° C.×120 minutes and subsequent air cooling.

tions of a carbonitriding temperature of 850° C. and hold time of 150 minutes. During the carbonitriding process, the ambient was a gas mixture of RX gas and ammonia gas. Here, for test bearings No. 1 to No. 3, different mixture ratios between RX gas and ammonia gas were used respectively for performing the carbonitriding. After this, following the heat treatment pattern shown in FIG. 6, primary quenching was performed from the carbonitriding temperature of 850° C., thereafter secondary quenching was performed by heating for 20 minutes at a temperature of 800° C. lower than the carbonitriding temperature, and subsequently tempering was performed at 180° C. for 90 minutes.

Test bearing No. 4: Standard heat treatment was performed. Specifically, in an RX gas ambient, heating was performed at a heating temperature of 840° C. for hold time of 20 minutes, then quenching was performed, and thereafter tempering was performed at 180° C. for 90 minutes.

Test bearings No. 5, No. 6: Carbonitriding was performed under the conditions of a carbonitriding temperature of 850° C. and hold time of 150 minutes. During the carbonitriding process, the ambient was a gas mixture of RX gas and ammonia gas. Here, for test bearings No. 5 and No. 6 respectively, different mixture ratios between RX gas and ammonia gas were used for performing the carbonitriding. After this, quenching was performed from 850° C. and subsequently tempering was performed at 180° C. for 90 minutes.

Regarding respective inner rings of test bearings No. 1 to No. 6 produced by the above-described methods, the results of a material property check and a functional evaluation test are shown in Table 1.

TABLE 1

| No. | austenite crystal grain size (JIS) | amount of retained austenite (vol %) | nitrogen content (mass %) | surface hardness (HV) | area ratio of spherical carbide (%) | relative rolling fatigue life | relative crack strength | relative crack fatigue strength | notes* |
|---|---|---|---|---|---|---|---|---|---|
| 1 | 12 | 12 | 0.12 | 780 | 13.6 | 3.2 | 1.1 | 1.2 | Ex 1 of the invention |
| 2 | 12 | 20 | 0.28 | 770 | 13.0 | 3.5 | 1.1 | 1.2 | Ex 2 of the invention |
| 3 | 11 | 24 | 0.62 | 730 | 11.4 | 3.3 | 1.1 | 1.3 | Ex 3 of the invention |
| 4 | 9 | 8 | 0 | 740 | 7.9 | 1 | 1 | 1 | Com Ex 1 |
| 5 | 8 | 29 | 0.31 | 760 | 9.6 | 1.9 | 0.8 | 1.2 | Com Ex 2 |
| 6 | 8 | 36 | 0.70 | 650 | 8.8 | 1.2 | 0.8 | 1.3 | Com Ex 3 |

*Ex: Example, Com Ex: Comparative Example

In the following, examples of the present invention are described.

EXAMPLE 1

JIS standard SUJ2 was used to produce a rolling bearing for a rocker arm for use in a rolling fatigue test. The bearing was a full-type needle bearing used for a rocker arm. An inner ring had the size: outer diameter φ 14.64 mm×width L 17.3 mm, and an outer ring had the size: inner diameter φ 18.64 mm×outer diameter φ 24 mm×width L 6.9 mm. A roller had the size: outer diameter φ 2 mm×length L 6.8 mm, and 26 rollers were used. Further, the bearing had the structure of a full type rolling bearing without cage. The bearing had a basic dynamic load rating of 8.6 kN and a basic static load rating of 12.9 kN.

Test bearings were each produced through the following history.

Test bearings No. 1 to No. 3 (examples of the present invention): Carbonitriding was performed under the condi- Respective methods of the material property check and the functional evaluation test are described.

(1) Austenite crystal grain size: The austenite crystal grain size was measured according to the method of testing the crystal grain size of austenite in a steel as defined by JIS G 0551.

(2) Amount of retained austenite: The amount of retained austenite was measured using X-ray diffraction by making a comparison between respective diffraction strengths of martensite α (211) and retained austenite γ (220). As the amount of retained austenite, the measurement in a surface layer of 50 μm of the rolling surface after grinding was employed.

(3) Nitrogen content: The nitrogen content was measured using EPMA. As the nitrogen content, the measurement in a surface layer of 50 μm of the rolling surface after grinding was employed.

(4) Surface hardness: The surface hardness was measured using a Vickers hardness tester (1 kgf).

(5) Area ratio of spherical carbide: The area ratio of the spherical carbide was measured using picric acid in alcohol (picral) for corroding, and thereafter observation was done with an optical microscope (×400). As the area ratio of the spherical carbide, the measurement in a surface layer of 50 μm of the rolling surface after grinding was used.

Figure 16:
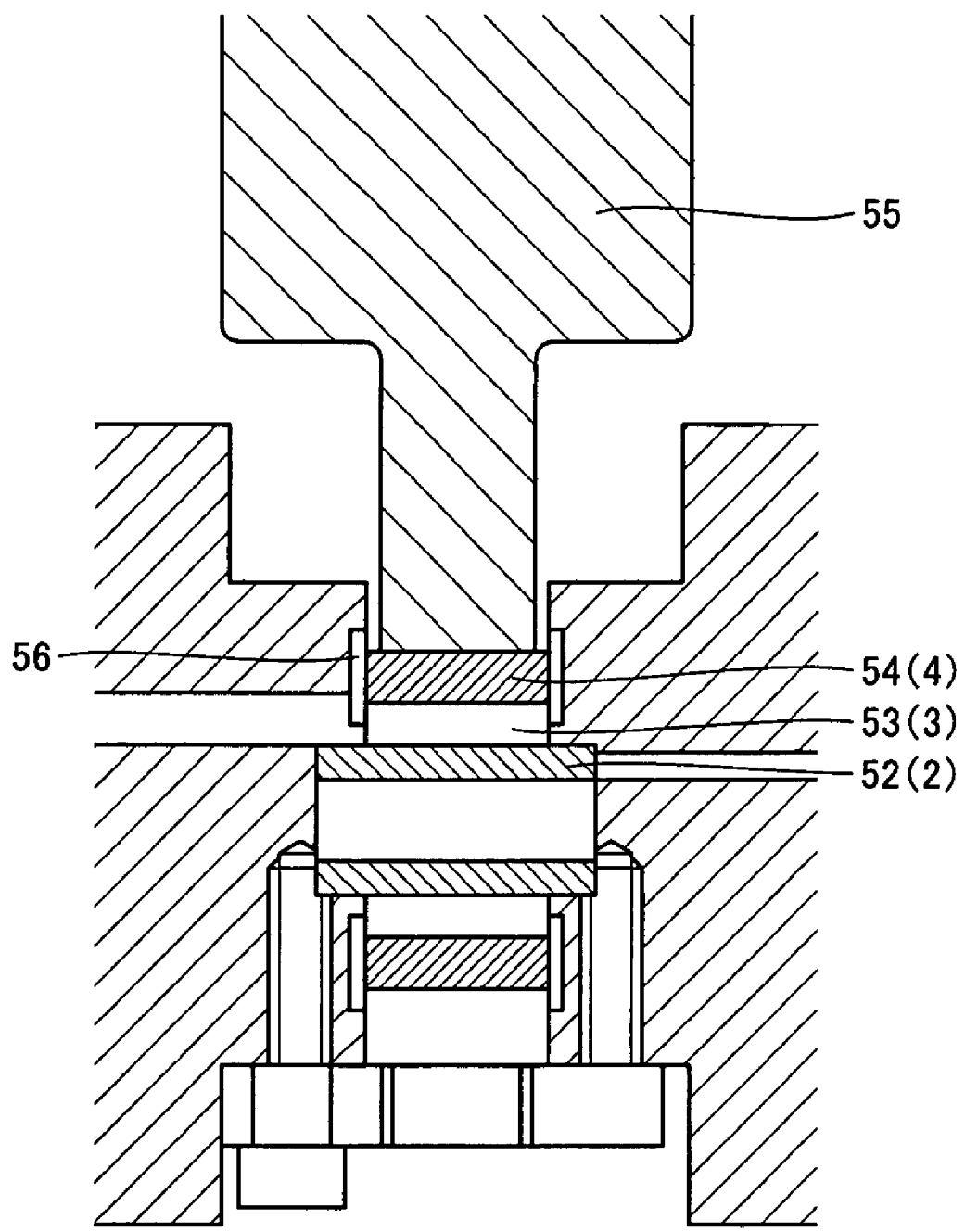
FIG. 16 shows a rolling fatigue tester for rotations of an outer ring.

(6) Rolling fatigue life test: A rolling fatigue life tester is shown in FIG. 16 and test conditions are shown in Table 2. The tester is applied to the rotation of the outer ring. Referring to FIG. 16, a plurality of needle rollers 53 were placed rollably between an outer-ring shaft 42 and an outer ring 54 that were incorporated in the tester. Outer ring 54 was rotated at a predetermined speed under a radial load applied by members 55, 66 to conduct rolling fatigue life test.

TABLE 2

| Rolling Life Test Conditions for Bearing | |
|---|---|
| tester | life tester for outer ring rotation |
| specimen | rocker arm bearing assembly |
| load (N) | 2580 N (0.3 C) |
| rotational speed of outer ring | 7000 rpm |
| lubricant | engine oil 10W-30 |
| oil temperature | 100° C. |
| life | peeling life |

(7) Static crack strength test: The outer ring of the test bearing was used, and a load was applied to the single bearing by means of an Amsler's testing machine to perform the static crack strength test.

(8) Crack fatigue strength test: The outer ring of the test bearing was used to conduct a crack fatigue strength test under the conditions shown in Table 3.

TABLE 3

| Ring Crack Fatigue Test Conditions | |
|---|---|
| tester | hydraulic servo type vibrator |
| specimen | φ18.64 × φ24 × L6.9 |
| load (N) | changed in the range of 3000-5000 |
| load frequency (Hz) | 20-50 (changed depending on load) |
| evaluation | strength at $10^5$ times on S/N curve |

It is noted that the results of (6) rolling fatigue life test, (7) static crack strength test and (8) crack fatigue strength test are each represented as a relative value with respect to 1 of standard heat-treated product No. 4.

The test results shown in Table 1 are described.

(1) Austenite crystal grain size: Products No. 1 to No. 3 of the present invention have remarkably fine grains with the crystal grain size number of 11 to 12. Products No. 4 to No. 6 that are standard heat-treated product and conventional carbonitrided products have austenite crystal grains with the crystal grain size number of 8 to 9 and thus the grains are larger than those of the products of the present invention.

(2) Amount of retained austenite: The amount of retained austenite of products No. 1 to No. 3 of the present invention is 12 to 24% and thus there is an appropriate amount of austenite. The amount of retained austenite of standard heat-treated product No. 4 is 8% which is smaller than that of the present invention. Further, the amount of retained austenite of conventional carbonitrided products No. 5 and No. 6 is 29 to 36% and thus is larger than that of the present invention. The amount of austenite of the products of the present invention is between that of the standard heat-treated product and that of the conventional carbonitrided products.

(3) Nitrogen content: The nitrogen content of products No. 1 to No. 3 of the present invention is 0.12 to 0.62%. Standard heat-treated product No. 4 is not carbonitrided and thus the nitrogen content is 0%. Further, the nitrogen content of conventional carbonitrided products No. 5 and No. 6 was 0.31 to 0.70%. The nitrogen content of the products of the present invention is slightly smaller than that of the conventional carbonitrided products. The reason for this seems to be that the products of the present invention undergo the secondary quenching, after the conventional carbonitriding, at a temperature of 800° C. lower than the carbonitriding temperature.

(4) Surface hardness: The surface hardness of products No. 1 to 3 of the present invention is HV 730 to HV 780. The surface hardness of standard heat-treated product No. 4 is HV 740. Conventional carbonitrided products No. 5 and No. 6 are respectively HV 760 and HV 650 in surface hardness. As for No. 6, the amount of the retained austenite is too large and thus hardness is not enough.

(5) Area ratio of spherical carbide: The spherical-carbide area ratio of products No. 1 to No. 3 of the present invention is 11.4 to 13.6%. The spherical-carbide area ratio of the standard heat-treated product and conventional carbonitrided products No. 4 to No. 6 is 7.9 to 9.6%. In the products of the present invention, as compared with the standard heat-treated product and conventional carbonitrided products, the area ratio of the spherical carbide is higher, and the carbide is finer and larger in amount. The reason for this seems to be that the products of the present invention undergo the secondary quenching, after the conventional carbonitriding, at a temperature of 800° C. lower than the carbonitriding temperature.

(6) Rolling fatigue life test: Products No. 1 to No. 3 of the present invention have a rolling fatigue life of at least three times as long as that of standard heat-treated product No. 4, and the rolling fatigue life is at least 1.5 times as long as that of carbonitrided products No. 5 and No. 6. Further, the rolling fatigue life of carbonitrided products No. 5 and No. 6 is slightly shorter than twice as long as that of standard heat-treated product No. 4.

(7) Static crack strength test: Products No. 1 to 3 of the present invention are equivalent to or improved relative to standard heat-treated product No. 4. Carbonitrided products No. 5 and No. 6 are lower in static crack strength as compared with standard heat-treated product No. 4. It seems this is due to the nitrogen-rich layer and larger austenite crystal grains in the surface layer portion.

(8) Crack fatigue strength test: Products No. 1 to No. 3 of the present invention are improved by 20% or more as compared with standard heat-treated product No. 4. Further, carbonitrided products No. 5 and No. 6 are improved by 20% or more as compared with standard heat-treated product No. 4. The reason for this seems to be that nitrogen entering the surface generates a compressive residual stress in the surface layer portion.

In summary, products No. 1 to No. 3 of the present invention have a nitrogen-rich layer in a surface layer portion, have austenite crystal grains that are made fine to have an austenite crystal grain size number of at least 11, have an appropriate amount of retained austenite, have an appropriate surface hardness, and have a high area ratio of the spherical carbide, and thus they are improved in usual load-dependent rolling fatigue life and crack fatigue strength.

EXAMPLE 2

JIS standard SUJ2 was used to produce test specimens for peeling and smearing tests. The specimens had the size: outer diameter φ 40 mm×width L 12. These test bearings were produced through the following history.

Test bearing No. 1 (Example 1 of the present invention): Carbonitriding was performed under the conditions of a carbonitriding temperature of 850° C. and hold time of 150 minutes. During the carbonitriding process, the ambient was a gas mixture of RX gas and ammonia gas. After this, following the heat treatment pattern shown in FIG. 6, primary quenching was performed from the carbonitriding temperature of 850° C., thereafter secondary quenching was performed by heating for 20 minutes at a temperature of 800° C. lower than the carbonitriding temperature, and subsequently tempering was performed at 180° C. for 90 minutes.

Test bearing No. 2 (Comparative Example 1): Standard heat treatment was performed. Specifically, in an RX gas ambient, heating was performed at a heating temperature of 840° C. for hold time of 20 minutes, thereafter quenching was performed and the tempering was then performed at 180° C. for 90 minutes.

Test bearing No. 3 Comparative Example 2): Carbonitriding was performed under the conditions of a carbonitriding temperature of 850° C. and hold time of 150 minutes. During the carbonitriding process, the ambient was a gas mixture of RX gas and ammonia gas. Subsequently, quenching was performed from 850° C. and thereafter tempering was performed at 180° C. for 90 minutes.

The results of a material property check, a peeling test and a smearing test for specimens No. 1 to No. 3 produced by the above-described methods are shown in Table 4.

TABLE 4

| No. | austenite crystal grain size (JIS) | amount of retained austenite (%) | nitrogen content (%) | surface hardness (HV) | area ratio of spherical carbide (%) | relative peeling strength | relative smearing strength | notes* |
|---|---|---|---|---|---|---|---|---|
| 1 | 12 | 21 | 0.30 | 770 | 13.0 | 1.8 | 1.7 | Ex 1 |
| 2 | 9 | 7 | 0 | 740 | 7.8 | 1 | 1 | Com Ex 1 |
| 3 | 8 | 29 | 0.31 | 760 | 9.5 | 1.4 | 1.5 | Com Ex 2 |

*Ex: Example, Com Ex: Comparative Example

Methods of the peeling test and smearing test are now described. It is noted that the results of the material property check were obtained by a method similar to that of Example 1.

(1) Peeling test: Under the test conditions shown in Table 5, a rough-surfaced standard heat-treated product according to JIS standard SUJ2 was used as a counterpart specimen, and a specimen and the counterpart specimen were brought into rolling contact with each other. The ratio of the area where peelings (a collection of fine peelings) were generated was measured, and the measurement was used as peeling strength. The peeling strength of standard heat-treated product No. 2 was defined as 1, and the relative peeling strength of each specimen was represented by the reciprocal of the measured peeling strength of each specimen.

TABLE 5

| Peeling Test Conditions | |
|---|---|
| tester | ring to ring type tester |
| specimen | φ40 straight, surface roughness (Rt) 0.2 μm |
| counterpart specimen | φ40 × R60, surface roughness (Rt) 3.0 μm (made by SUJ2) |
| contact surface pressure | Pmax 2.3 GPa |
| lubricating oil | turbine oil VG46 |
| rotational speed of | 2000 rpm (specimen rolls following rotation of counterpart specimen) |
| counterpart specimen | |
| total load count | $4.8 \times 10^5$ times |

(2) Smearing test: Under the test conditions shown in Table 6, a specimen to be tested and a counterpart specimen that were both made of a combination of the same materials were used. The test samples were brought into rolling contact with each other, and only the specimen to be tested was increased in rotational speed at a constant rate. In this case, the relative rotational speed of the specimens at the instant when generated sound exceeds a certain value was used as a smearing strength. The relative smearing strength of each test bearing was represented with respect to 1 of standard heat-treated product No. 2.

TABLE 6

| Smearing Test Conditions | |
|---|---|
| tester | ring to ring type tester |
| specimen | φ40 × R60 surface roughness (Rt) 3.0 μm |
| counterpart specimen | φ40 × R60 surface roughness (Rt) 3.0 μm |
| contact surface pressure | Pmax 2.1 GPa |
| lubricating oil | turbine oil VG46 |
| rotational speed of counterpart specimen | 200 rpm, acceleration of 100 rpm per 30 sec |
| rotational speed of specimen | 200 rpm |

The results of the tests shown in Table 4 are described below.

(1) Peeling test: Product No. 1 of the present invention has the peeling strength that is at least 1.5 times as high as that of standard heat-treated product No. 2 and that is the same or somewhat improved relative to carbonitrided product No. 3. The reason for this is considered as follows. The surface layer has the nitrogen-rich layer, the austenite grains are made fine to have the grain size number of at least 11, an appropriate amount of austenite retains, the surface hardness is appropriate, and the area ratio of the spherical carbide is high. Accordingly, the toughness is enhanced and the resistance to generation and development of cracks is increased.

(2) Smearing test: Product No. 1 of the present invention has the peeling strength that is at least 1.5 times as high as that of standard heat-treated product No. 2 and that is the same or somewhat improved relative to carbonitrided product No. 3.

The reason for this is considered as follows. The surface layer has the nitrogen-rich layer, the austenite grains are made fine to have the grain size number of at least 11, an appropriate amount of austenite retains, the surface hardness is appropriate, and the area ratio of the spherical carbide is high. Accordingly, plastic flow in the surface layer under the condition of large slide is prevented and the anti-seizure property is improved.

In summary, product No. 1 of the present invention has the bearing material properties that are superior to conventional ones in terms of the peeling test and the smearing test. Further, the surface damage life is also improved that is due to the fact that lubricating condition is bad, interference between rollers occurs, the roller position is not smoothly controlled and skew of rollers occurs.

The product of the present invention has a nitrogen-rich layer in the surface layer, austenite grains that are made fine to have the grain size number of at least 11, an appropriate amount of retained austenite, and an appropriate surface hardness and a high area ratio of the spherical carbide. Therefore, the product of the present invention has a considerably high resistance to occurrence and development of cracks, so that surface cracks caused by surface heat generation and tangential force due to sliding can be prevented.

EXAMPLE 3

A material according to JIS standard SUJ2 (1.0 wt % of C—0.25 wt % of Si—0.4 wt % of Mn—1.5 wt % of Cr) was used to (1) measure the hydrogen content, (2) measure the crystal grain size, (4) perform a Charpy impact test, (5) measure the fracture stress, and (5) perform a rolling fatigue test. Table 7 shows the results.

Samples E, F (comparative examples): Carbonitriding was performed through the same history as that of examples A to D of the present invention. The secondary quenching temperature was 850° C. to 870° C. that is equal to or higher than the carbonitriding temperature of 850° C.

Conventional carbonitrided product (comparative example): Carbonitriding was performed at 850° C. for hold time of 150 minutes. The ambient was a gas mixture of RX gas and ammonia gas. From the carbonitriding temperature, quenching was immediately performed and the secondary quenching was not performed.

Normal quenched product (comparative example): Without carbonitriding, heating was performed to 850° C. for quenching. Secondary quenching was not performed.

Test methods are described below.

(1) Measurement of Hydrogen Content

The hydrogen content was analyzed by means of a DH-103 type hydrogen analyzer manufactured by LECO Corporation to analyze the content of non-diffusible hydrogen in a steel. The content of diffusible hydrogen was not measured. Specifications of the LECO DH-103 hydrogen analyzer are as follows.

Analysis range: 0.01-50.00 ppm

Analysis precision: ±0.1 ppm or ±3% H (higher one)

Analysis sensitivity: 0.01 ppm

Detection method: thermal conductimetry

Sample weight size: 10 mg-35 mg (max: 12 mm (diameter)×100 mm (length))

Furnace temperature range: 50° C.-1100° C.

Reagent: anhydron $Mg(ClO_4)_2$, Ascarite, NaOH

Carrier gas: nitrogen gas, Gas dosing gas: hydrogen gas

TABLE 7

| | sample | | | | | | | |
|---|---|---|---|---|---|---|---|---|
| | A | B | C | D | E | F | conventional carbonitrided product | normal quenched product |
| secondary quenching temperature (° C.) | 780[1] | 800 | 815 | 830 | 850 | 870 | — | — |
| hydrogen content (ppm) | — | 0.37 | 0.40 | 0.38 | 0.42 | 0.40 | 0.72 | 0.38 |
| crystal grain size (JIS) | — | 12 | 11.5 | 11 | 10 | 10 | 10 | 10 |
| Charpy impact value (J/cm²) | — | 6.65 | 6.40 | 6.30 | 6.20 | 6.30 | 5.33 | 6.70 |
| fracture stress (MPa) | — | 2840 | 2780 | 2650 | 2650 | 2700 | 2330 | 2770 |
| relative rolling fatigue life ($L_{10}$) | — | 5.4 | 4.2 | 3.5 | 2.9 | 2.8 | 3.1 | 1 |

[1]evaluation failed here due to insufficient quenching

Each sample was produced through the following history.

Samples A-D (examples of the present invention): Carbonitriding was performed at 850° C. for hold time of 150 minutes. The ambient was a gas mixture of RX gas and ammonia gas. According to the heat treatment pattern shown in FIG. 6, primary quenching was performed from the carbonitriding temperature 850° C., then secondary quenching was performed by heating to a temperature range of 780° C. to 830° C. lower than the carbonitriding temperature. However, Sample A with the secondary quenching temperature of 780° C. was insufficient in quenching and thus was not tested.

Both gases have a purity of at least 99.99% and a pressure of 40 psi (2.8 kgf/cm²).

The procedure of the measurement is roughly described below. A sample was taken by a dedicated sampler and the sample together with the sampler was put into the hydrogen analyzer. Diffusible hydrogen therein was directed by the nitrogen carrier gas to a thermal conductimetry detector. The diffusible hydrogen was not measured in the present Example. Then, the sample was taken out of the sampler to be heated in a resistance heater, and non-diffusible hydrogen was directed by the nitrogen carrier gas to the thermal conductimetry detector. The thermal conductivity was measured by the thermal conductimetry detector to determine the content of non-diffusible hydrogen.

(2) Measurement of Crystal Grain Size

The crystal grain size was measured according to the method of testing the crystal grain size of austenite in a steel defined by JIS G 0551.

(3) Charpy Impact Test

A Charpy impact test was conducted according to the Charpy impact test method for a metal material defined by JIS Z 2242. A specimen used here was a U-notch specimen (JIS No. 3 specimen) defined by JIS Z 2202.

(4) Measurement of Fracture Stress

Figure 17:
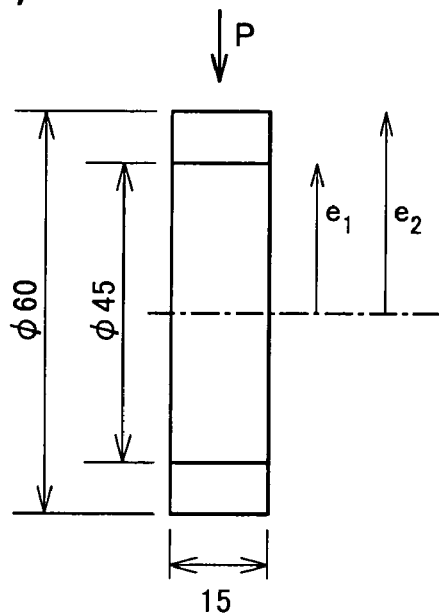
FIG. 17 shows a specimen for a static-pressure fracture strength test (for measuring the value of fracture stress).

FIG. 17 shows a specimen for a static-pressure fracture strength test (for measuring fracture stress). A load was exerted in direction P in FIG. 17 and the load when the specimen was fractured was measured. Then, the measured fracture load was converted into a stress value by the following stress calculation formula for a curved beam. It is noted that the specimen to be used is not limited to the one shown in FIG. 17 and may be any specimen having a different shape.

Suppose that a fiber stress on the convex surface of the specimen in FIG. 17 is $\sigma_1$ and a fiber stress on the concave surface is $\sigma_2$, then, $\sigma_1$ and $\sigma_2$ are determined by the following formula (JSME Mechanical Engineer's Handbook, A4-strength of materials, A4-40). Here, N indicates an axial force of a cross section including the axis of the annular specimen, A indicates a cross-sectional area, $e_1$ indicates an outer radius, $e_2$ indicates an inner radius, and $\kappa$ is a section modulus of the curbed beam.

$$\sigma_1 = (N/A) + \{M/(A\rho_o)\}[1 + e1/\{\kappa(\rho_o + e_1)\}]$$

$$\sigma_2 = (N/A) + \{M/(A\rho_o)\}[1 - e2/\{\kappa(\rho_o - e_2)\}]$$

$$\kappa = -(1/A) \int A\{\eta/(\rho_o + \eta)\} dA$$

(5) Rolling Fatigue Life

Figure 18:
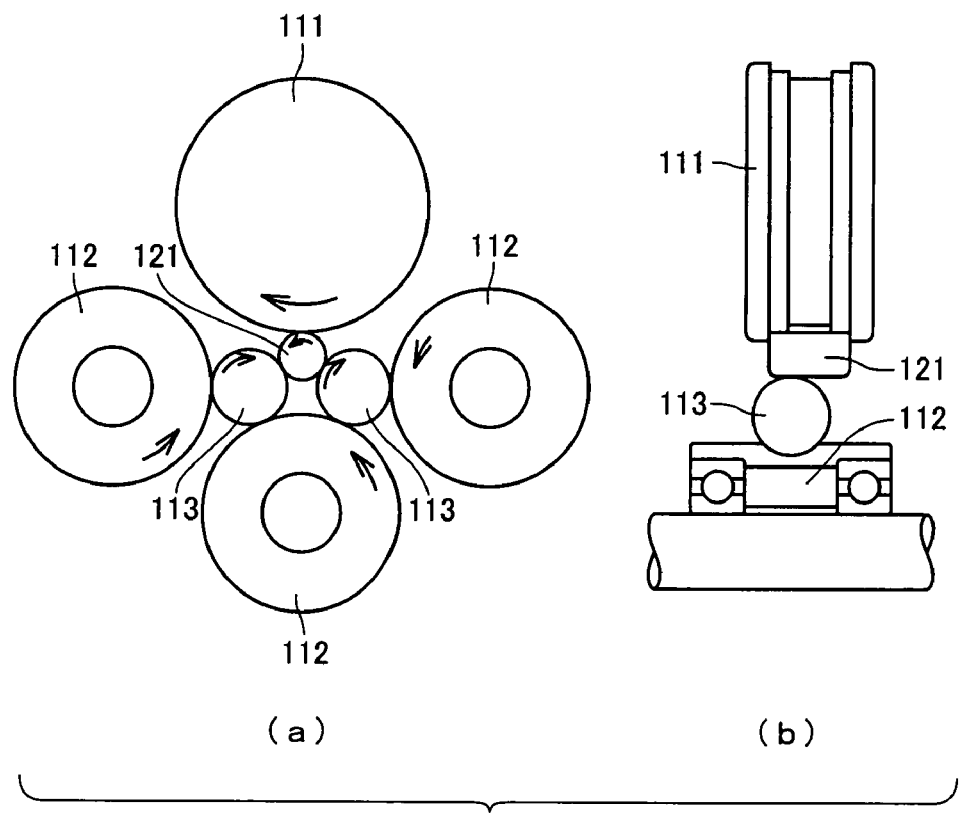
FIG. 18 schematically shows a rolling fatigue life tester. (a) is a front view and (b) is a side view.

Test conditions for a rolling fatigue life test are shown in Table 8. FIG. 18 schematically shows a rolling fatigue life tester, FIG. 18(*a*) is a front view and FIG. 18(*b*) is a side view. Referring to FIG. 18(*a*) and FIG. 18(*b*), a specimen 121 for the rolling fatigue life test was driven by a drive roll 111 to rotate while being in contact with balls 113. Balls 113 were (¾)" balls guided by a guide roll 112 to roll, while exerting a high surface pressure on specimen 121 while specimen 121 also exerted a high surface pressure on balls 113.

TABLE 8

| specimen | φ12 × L22 cylindrical specimen |
|---|---|
| number of specimens | 10 |
| counterpart steel ball | ¾" (19.05 mm) |
| contact surface pressure | 5.88 GPa |
| load speed | 46240 cpm |
| lubricating oil | turbine VG68 - forced circulation lubricant |

The test results shown in Table 7 are described below.

(1) Hydrogen Content

The conventional carbonitrided product without being additionally processed has a considerably high hydrogen content of 0.72 ppm. A reason therefor is considered that ammonia (NH$_3$) contained in the atmosphere in the carbonitriding process is decomposed and then hydrogen enters the steel. In contrast, the hydrogen content of Samples B to D is decreased to 0.37 to 0.40 ppm that is approximately a half of the aforementioned hydrogen content. This hydrogen content is substantially equal to that of the normal quenched product.

The above-described decrease of the hydrogen content can lessen the degree of embrittlement of the steel that is due to hydrogen in the solid solution. In other words, by the decrease of the hydrogen content, the Charpy impact value of Samples B to D of the present invention is remarkably improved.

(2) Crystal Grain Size

Regarding the crystal grain size, samples that are secondary quenched at a temperature lower than the quenching temperature in the carbonitriding process (primary quenching), namely Samples B to D have austenite grains which are remarkably made fine, i.e., crystal grain size number is 11 to 12. Samples E and F as well as the conventional carbonitrided product and the normal quenched product have austenite grains with the crystal grain size number of 10, which means that the crystal grain size is greater than that of Samples B to D of the present invention.

(3) Charpy Impact Test

Table 9 shows that the Charpy impact value of the conventional carbonitrided product is 5.33 J/cm$^2$ while that of Samples B to D of the present invention is higher that is 6.30 to 6.65 J/cm$^2$. It is also seen from this that a lower secondary quenching temperature leads to a higher Charpy impact value. The normal quenched product has a high Charpy impact value of 6.70 J/cm$^2$.

(4) Measurement of Fracture Stress

The fracture stress corresponds to anti-crack strength. It is seen from Table 7 that the fracture stress of the conventional carbonitrided product is 2330 MPa. In contrast, the fracture stress of Samples B to D is improved to 2650 to 2840 MPa. The normal quenched product has a fracture stress of 2770 MPa. It is considered that the reduction in hydrogen content considerably contributes to the improved anti-crack strength of samples B to D as well as the reduction in size of austenite crystal grains.

(5) Rolling Fatigue Test

According to Table 7, the normal quenched product has the shortest rolling fatigue life $L_{10}$ due to the absence of nitrogen-rich layer in the surface layer. In contrast, the rolling fatigue life of the conventional carbonitrided product is 3.1 times as long as that of the normal quenched product. The rolling fatigue life of samples B to D is remarkably improved as compared with the conventional carbonitrided product. Samples E and F of the present invention have the rolling fatigue life almost equal to that of the conventional carbonitrided product.

In summary, Samples B to D of the present invention have the lower hydrogen content, finer austenite crystal grains with the crystal grain size number of at least 11, and improved Charpy impact value, anti-crack strength and rolling fatigue life.

EXAMPLE 4

Example 4 is described. On the following materials X, Y and Z, a series of tests was conducted. A material to be heat-treated that was employed commonly to Materials X to Z was JIS-SUJ2 (1.0 wt % of C—0.25 wt % of Si—0.4 wt % of Mn—1.5 wt % of Cr). Materials X to Z were each produced through the following history.

Material X—comparative example: normal quenching only (without carbonitriding)

Material Y—comparative example: quenching directly after carbonitriding (conventional carbonitriding and quenching)

Carbonitriding was performed at 845° C. for hold time 150 minutes. The ambient in the carbonitriding process was a mixture of RX gas and ammonia gas.

Material Z—example of the present invention: A bearing material was processed following the heat treatment pattern shown in FIG. 6. Carbonitriding was performed at 845° C. for hold time of 150 minutes. The ambient in the carbonitriding process was a mixture of RX gas and ammonia gas. Final quenching temperature was 800° C.

(1) Rolling Fatigue Life

Test conditions and the test device for the rolling fatigue life test are as shown in Table 8 and FIG. 16 as described above. Results of the rolling fatigue life test are shown in Table 9.

TABLE 9

| | life (load count) | | |
|---|---|---|---|
| material | $L_{10}$ (×10$^4$ times) | $L_{10}$ (×10$^4$ times) | relative $L_{10}$ |
| X | 8017 | 18648 | 1.0 |
| Y | 24656 | 33974 | 3.1 |
| Z | 43244 | 69031 | 5.4 |

According to Table 9, Material Y which is a comparative example has an $L_{10}$ life (one out of ten specimens is damaged) that is 3.1 times as long as that of Material X which is also a comparative example and undergoes normal quenching only, and thus it is seen that the effect of extending the life is obtained through the carbonitriding process. In contrast, Material Z of the present invention has a longer life which is 1.74 times as long as that of Material Y and 5.4 times as long as that of Material X. It is considered that this improvement is obtained mainly from the fine microstructure.

(2) Charpy Impact Test

A Charpy impact test was conducted by using a U-notch specimen defined by JIS Z 2242 mentioned above. Test results are shown in Table 10.

TABLE 10

| material | Charpy impact value (J/cm$^2$) | relative impact value |
|---|---|---|
| X | 6.7 | 1.0 |
| Y | 5.3 | 0.8 |
| Z | 6.7 | 1.0 |

Material Y (comparative example) having undergone carbonitriding has a Charpy impact value which is not larger than that of Material X (comparative example) having undergone normal quenching, while Material Z has a Charpy impact value equivalent to that of Material X.

(3) Static Fracture Toughness Test

Figure 19:
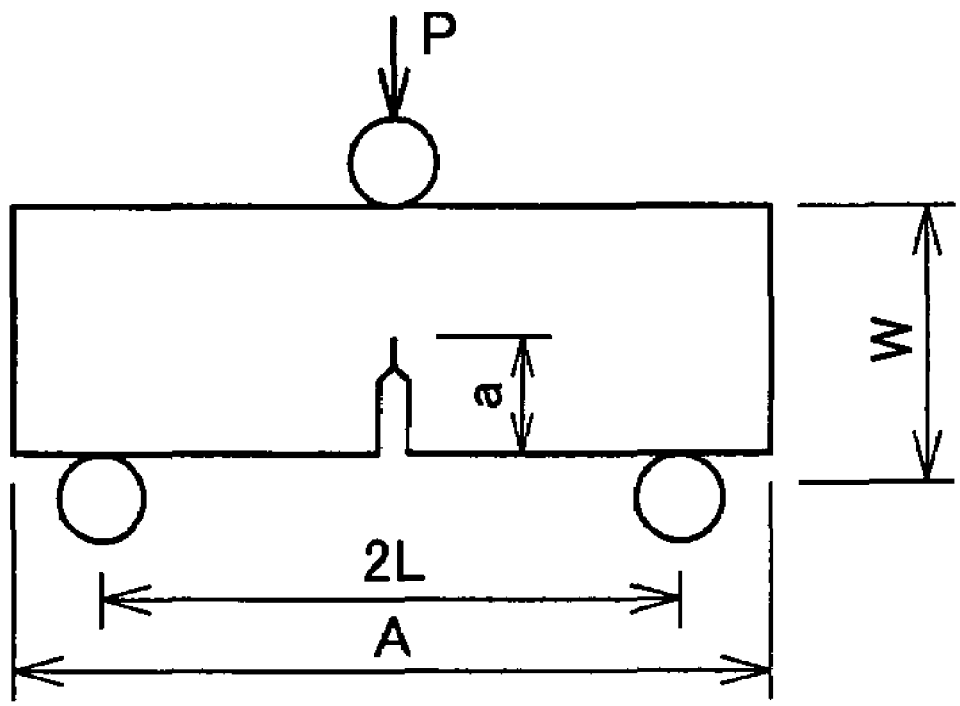
FIG. 19 shows a specimen for a static fracture toughness test.

FIG. 19 shows a specimen for a static fracture toughness test. In the notch of the specimen, a pre-crack of approximately 1 mm was made, thereafter a static load by three-point bending was added, and then fracture load P was determined. Using the following formula (I), a fracture toughness value ($K_{Ic}$ value) was calculated. The results of the test are shown in Table 11.

$$K_{Ic}=(PL\sqrt{a}/BW^2)\{5.8-9.2(a/W)+43.6(a/W)^2-75.3(a/W)^3+77.5(a/W)^4\} \quad (I)$$

TABLE 11

| material | number tested | $K_{Ic}$ (MPa$\sqrt{m}$) | relative $K_{Ic}$ |
|---|---|---|---|
| X | 3 | 16.3 | 1.0 |
| Y | 3 | 16.1 | 1.0 |
| Z | 3 | 18.9 | 1.2 |

As the pre-crack has a depth greater than the depth of the nitrogen-rich layer and thus the same results are obtained for Materials X and Y of the comparative examples. However, the result for Material Z which is an example of the present invention is approximately 1.2 times as high as that of the comparative examples.

(4) Static-Pressure Fracture Strength Test (Measurement of Fracture Stress)

A static-pressure fracture strength specimen as shown in FIG. 17 as described above was used. A load was exerted in direction P in FIG. 17 to conduct a static-pressure fracture strength test. The test results are shown in Table 12.

TABLE 12

| material | number tested | static fracture strength (kgf) | relative static fracture strength |
|---|---|---|---|
| X | 3 | 4200 | 1.00 |
| Y | 3 | 3500 | 0.84 |
| Z | 3 | 4300 | 1.03 |

Material Y having undergone carbonitriding has the strength that is somewhat smaller than that of Material X having undergone normal quenching. However, Material Z of the present invention has an improved static-pressure fracture strength compared with Material Y that is equivalent to that of Material X.

(5) Rate of Secular Dimensional Change

Table 13 shows the rate of secular dimensional change measured under the conditions that the hold temperature is 130° C. and the hold time is 500 hours, together with the surface hardness and the amount of retained austenite (depth 0.1 mm).

TABLE 13

| material | number tested | surface hardness (HRC) | retained γ (vol %) | rate of dimensional change (×10$^{-5}$) | relative rate of dimensional change*⁾ |
|---|---|---|---|---|---|
| X | 3 | 62.5 | 8.8 | 18 | 1.0 |
| Y | 3 | 63.6 | 30.5 | 35 | 1.9 |
| Z | 3 | 60.0 | 11.8 | 22 | 1.2 |

*⁾smaller is superior

As compared with the rate of dimensional change of Material Y having a large amount of retained austenite, Material Z has a lower amount of retained austenite which is one-half or less.

(6) Life Test Under Contaminated Lubricant Condition

Ball bearing 6206 was used to evaluate the rolling fatigue life under a contaminated lubricant condition having a predetermined amount of normal contaminants mixed therein. Test conditions are shown in Table 14 and the test results are shown in Table 15.

TABLE 14

| | |
|---|---|
| load | Fr = 6.86 kN |
| contact surface pressure | Pmax = 3.2 Gpa |
| rotational speed | 2000 rpm |
| lubricant | turbine 56 oil bath lubrication |
| amount of contaminant | 0.4 g/1000 cc |
| contaminant | grain size: 100-180 μm, hardness: Hv 800 |

TABLE 15

| material | L$_{10}$ life (h) | relative L$_{10}$ |
|---|---|---|
| X | 20.0 | 1.0 |
| Y | 50.2 | 2.5 |
| Z | 45.8 | 2.3 |

Material Y having undergone conventional carbonitriding has a life which is approximately 2.5 times as long as that of Material X, and Material Z of the present invention has a life which is approximately 2.3 times as long as that of Material X. While Material Z of the present invention has a smaller amount of retained austenite than that of Material Y of the comparative example, Material Z has a long life substantially equivalent to or longer than that of Material Y because of influences of entering nitrogen and the fine microstructure.

It is seen from the results above that, Material Z of the present invention, namely a bearing component produced by the heat treatment method of the present invention can simultaneously achieve three goals: extension of the rolling fatigue life that has been difficult to achieve by the conventional carbonitriding, improvement in crack strength and reduction of the rate of secular dimensional change.

EXAMPLE 5

Three different heat treatment methods, namely standard heat treatment, carbonitriding and heat treatment of the present invention were used to produce an outer ring, an outer-ring shaft and rollers of a rolling bearing for a rocker arm. The standard heat treatment, the carbonitriding and the heat treatment of the present invention herein refer to the following heat treatment methods.

Standard heat treatment: In an RX gas ambient, heating was performed at a heating temperature of 840° C. for hold time of 20 minutes, thereafter quenching was performed and subsequently tempering was performed at 180° C. for 90 minutes.

Carbonitriding: In an ambient of a gas mixture of RX gas and ammonia gas, heating was performed at a temperature of 850° C. for hold time of 150 minutes, thereafter quenching was performed from the temperature 850° C. and subsequently tempering was performed at 180° C. for 90 minutes.

Heat treatment of the present invention: Carbonitriding was performed under the conditions of a carbonitriding temperature of 850° C. and hold time of 150 minutes. During the carbonitriding process, the ambient was a gas mixture of RX gas and ammonia gas. After this, following the heat treatment pattern shown in FIG. 6, primary quenching was performed from the carbonitriding temperature of 850° C., then secondary quenching was performed by heating at a temperature of 800° C. lower than the carbonitriding temperature for 20 minutes and subsequently tempering was performed at 180° C. for 90 minutes.

Material properties of the members produced by these heat treatment methods are shown in Table 16.

TABLE 16

| heat treatment method | austenite crystal grain size (JIS) | amount of retained austenite (vol %) | nitrogen content (mass %) |
|---|---|---|---|
| standard heat treatment | 9 | 7 | 0 |
| carbonitriding | 8 | 29 | 0.31 |
| heat treatment of the present invention | 12 | 21 | 0.30 |

Methods for a material property check are described below.

(1) Austenite crystal grain size: The austenite crystal grain size was measured according to the method of testing the crystal grain size of austenite in a steel as defined by JIS G 0551.

(2) Amount of retained austenite: The amount of retained austenite was measured by means of the X-ray diffraction by making a comparison between respective diffraction strengths of martensite α (211) and retained austenite γ (220). As the amount of retained austenite, the measurement in a surface layer of 50 μm of the rolling surface after grinding was employed.

(3) Nitrogen content: The nitrogen content was measured using EPMA. As the nitrogen content, the measurement in a surface layer of 50 μm of the rolling surface after grinding was employed.

The test results shown in Table 16 are described.

(1) Austenite crystal grain size: The member that is heat-treated according to the present invention has the crystal grain size number of 12, which means that austenite crystal grains are remarkably made fine. The standard heat-treated member and the carbonitrided member have respective crystal grain size numbers of 9 and 8, which means that austenite crystal grains are larger than those of the heat-treated member of the present invention.

(2) Amount of retained austenite: The member heat-treated according to the present invention has a retained austenite amount of 21% by volume, which means that an appropriate amount of austenite is contained. The standard heat-treated member has a retained austenite amount of 7% by volume, which is lower than that of the heat-treated member of the present invention. Further, the carbonitrided member has a retained austenite amount of 29% by volume, which is higher than that of the heat-treated member of the present invention. As seen from the above, the amount of retained austenite of the heat-treated member of the present invention is between those of the standard heat-treated member and the carbonitrided member.

(3) Nitrogen content: The member heat-treated according to the present invention has a nitrogen content of 0.30%. The standard heat-treated member is not carbonitrided and thus has a nitrogen content of 0%. Further, the carbonitrided member has a nitrogen content of 0.31%. The nitrogen content of the heat-treated member of the present invention is slightly lower than that of the carbonitrided member. The reason for this is considered that the heat treatment of the present invention performs, after the carbonitriding, secondary quenching at 800° C. lower than the carbonitriding temperature.

Figure 20:
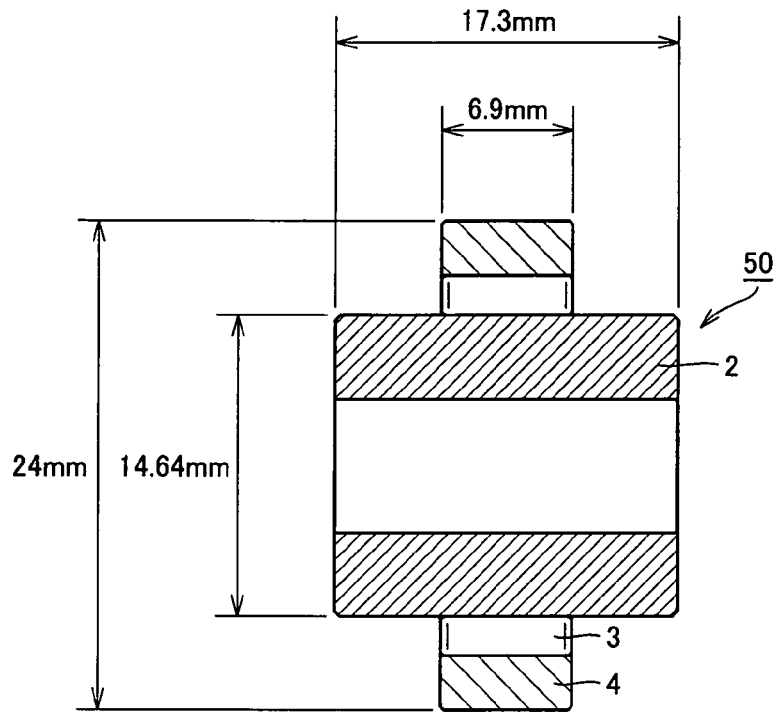
FIG. 20 is a cross-sectional view showing a structure (dimensions) of Sample 1 to Sample 6 of Example 5.
Figure 21:
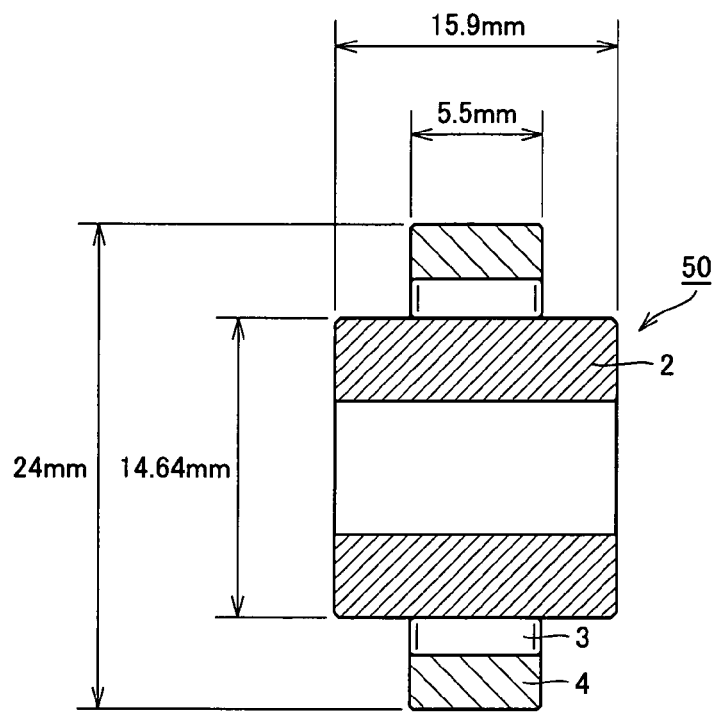
FIG. 21 is a cross-sectional view showing a structure (dimensions) of Sample 7 to Sample 11 of Example 5.

Then, outer rings, outer-ring shafts and rollers produced by the above-described three different heat treatment methods were combined in various ways to produce a rolling bearing for a rocker arm. The resultant products were referred to as Samples 1 to 11. Of these samples, Samples 1 to 6 have a structure (dimension) shown in the cross-sectional view of FIG. 20, and Samples 7 to 11 have a structure (dimension) shown in the cross-sectional view of FIG. 21. As shown in FIG. 20, regarding Samples 1 to 6, outer ring 4 and rollers 3 have a width of 6.9 mm, and outer-ring shaft 2 has a width of 17.3 mm. In contrast, as shown in FIG. 21, regarding Samples 7 to 11, outer ring 4 and rollers 3 have a width of 5.5 mm and outer-ring shaft 2 has a width of 15.9 mm. In other words, Samples 7 to 11 are made compact by approximately 20% relative to Samples 1 to 6.

Figure 22:
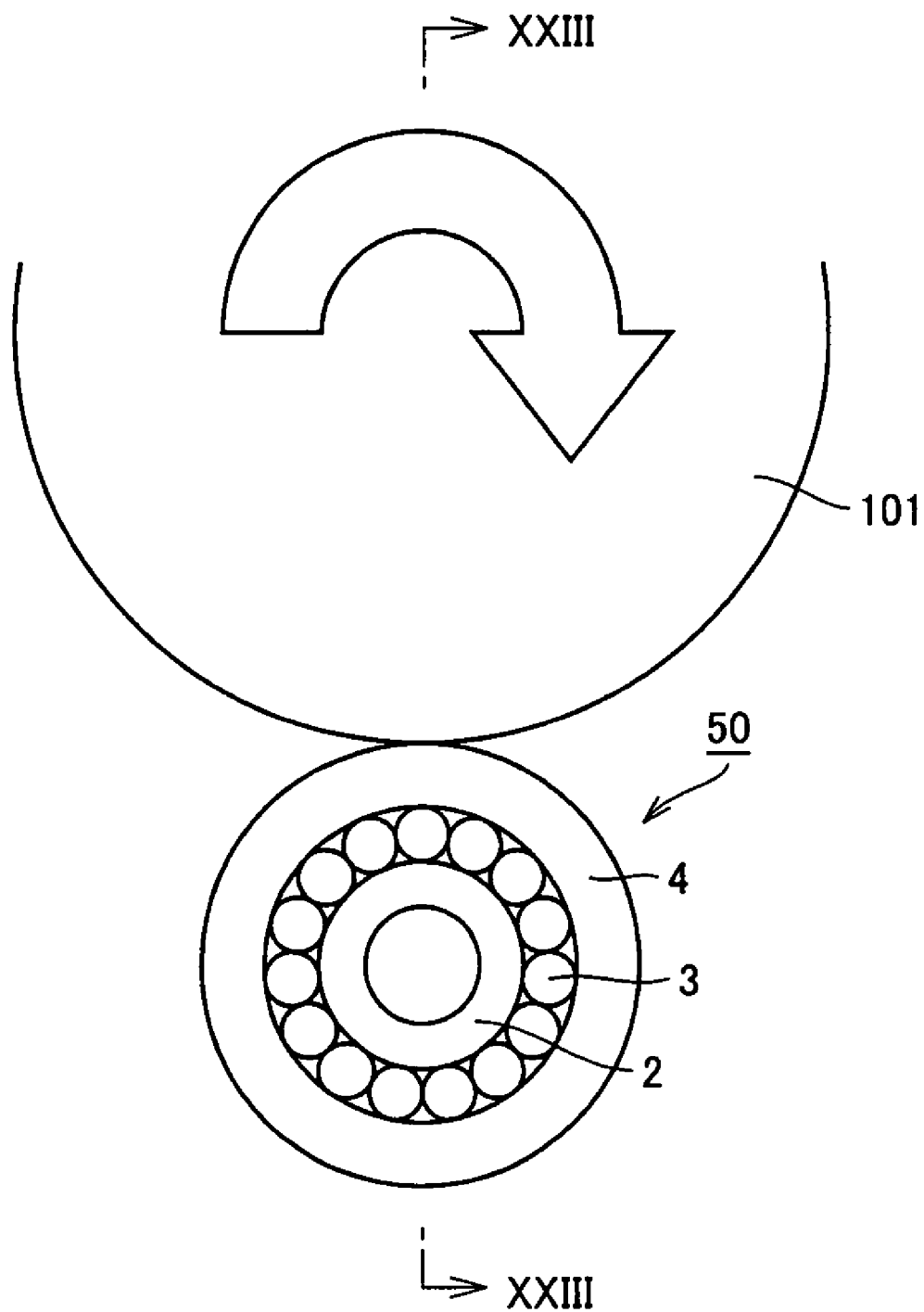
FIG. 22 is a front view showing a main portion of a peeling life tester.
Figure 23:
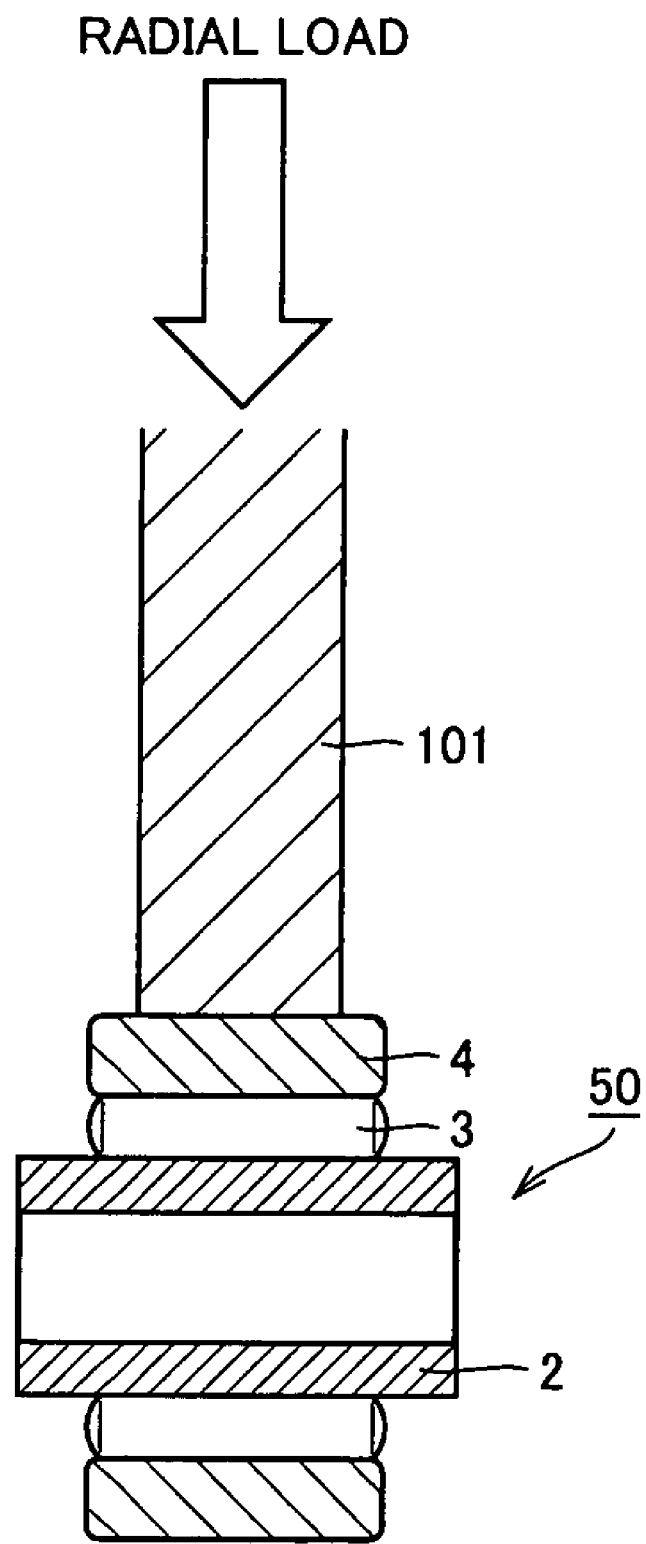
FIG. 23 is a cross-sectional view along a line XXIII-XXIII in FIG. 22.

Subsequently, on Samples 1 to 11, a peeling life test was conducted by the following method. FIG. 22 is a front view showing a main part of a peeling life tester, and FIG. 23 is a cross-sectional view along a line XXIII-XXIII in FIG. 22. As shown in FIGS. 22 and 23, a rocker arm rolling bearing 50 is disposed in the state where a drive roll 101 of the peeling life tester and outer ring 4 contact each other, and outer-ring shaft 2 is fixed. Then, in the state where a radial load is applied from drive roll 101 of the peeling life tester to rocker arm rolling bearing 50, drive roll 101 is rotated in the direction indicated by the arrow in FIG. 22 to cause outer ring 4 to rotate. The time (life) passed until any of outer ring 4, outer-ring shaft 2 and rollers 3 has peeling was measured. Here, the load applied from drive roll 101 to rocker arm rolling bearing 50 was 2.58 kN, and the rotational speed of outer ring 4 was 7000 r/min. Further, as a lubricating oil between the outer ring and the outer-ring shaft, 10W-30 engine oil was used and the lubricating oil had a temperature of 100° C.

A combination of members for each sample and the peeling life of each sample are shown in Tables 17 and 18. Products of the present inventions are Samples 6, 9, and 11. The peeling life of each sample is represented relative to the peeling life 1 of Sample 1.

TABLE 17

| | sample No. | | | | | |
|---|---|---|---|---|---|---|
| | 1 | 2 | 3 | 4 | 5 | 6 |
| sample width (mm) | | | | 6.9 | | |
| outer ring | standard heat treatment | | carbonitriding | | standard heat treatment | heat treatment of the invention |
| roller (rolling element) | standard heat treatment | | carbonitriding | | heat treatment of the invention | |
| inner ring (outer-ring shaft) | standard heat treatment | | carbonitriding | | heat treatment of the invention | |
| load | | | | 2.58 kN | | |
| broken member | shaft, roller | shaft | shaft | shaft | shaft | Shaft |
| peeling life | 1 | 1.3 | 1.7 | 1.9 | 2.8 | 3.5 |

TABLE 18

| | sample No. | | | | |
|---|---|---|---|---|---|
| | 7 | 8 | 9 | 10 | 11 |
| sample width (mm) | | | 5.5 | | |
| outer ring | standard heat treatment | | carbonitriding | | |
| roller (rolling element) | carbonitriding | heat treatment of the invention | carbonitriding | heat treatment of the invention | |
| inner ring (outer-ring shaft) | carbonitriding | | | heat treatment of the invention | |

TABLE 18-continued

| | sample No. | | | | |
|---|---|---|---|---|---|
| | 7 | 8 | 9 | 10 | 11 |
| load | | | 2.58 kN | | |
| broken member | outer ring | shaft | shaft | shaft | shaft |
| peeling life | 0.8 | 1.1 | 1.2 | 1.5 | 1.7 |

As shown in Table 17, Sample 6 having the outer ring, the outer-ring shaft and the rollers that are all made of the members heat-treated according to the present invention has the peeling life that is 3.5 times as long as that of Sample 1 having its components that are all made of the standard-heat-treated members. Further, as shown in Table 18, it is seen that, even if the bearing is made compact, Sample 9 having the outer ring and the outer-ring shaft which are carbonitrided as well as rollers which are heat-treated according to the present invention has the peeling life that is 1.2 times as long as that of Sample 1. Further, it is seen that Sample 10 having the outer ring and the rollers which are carbonitrided and the outer-ring shaft which is heat treated according to the present invention has the peeling life that is 1.5 times as long as that of Sample 1. In addition, it is seen that Sample 11 having the outer ring that is carbonitrided and rollers and outer-ring shaft that are heat treated according to the present invention has the peeling life that is 1.7 times as long as that of Sample 1. It is seen from the results described above that the life can be prevented from shortening while the bearing is made compact, under the conditions that all of the outer-ring, outer-ring shaft and rollers have nitrogen-rich layers and at least one of the outer-ring shaft and the rollers is heat-treated according to the present invention.

EXAMPLE 6

JIS standard SUJ2 was used to produce a bearing for testing rolling fatigue. The bearing is a full-type needle bearing to be used for a rocker arm. The inner ring has the size: inner diameter φ 10 mm×outer diameter φ 14.64 mm×width L 15 mm. The outer ring has the size: inner diameter φ 18.64 mm×outer diameter φ 24 mm×width L 7 mm. 26 rollers having the size: outer diameter φ 2 mm×length L 6.8 mm were used. The structure is of the full-type without cage. The bearing has a basic dynamic load rating of 8.6 kN and a basic static load rating of 12.9 kN.

The inner ring of each test bearing was produced through the following history.

Test bearing No. 1 (example 1 of the present invention): High-frequency induction heating was performed so that a resultant hardened layer has the pattern as shown in FIG. 11(b).

Test bearings No. 2, No. 3 (examples 2, 3 of the present invention): Heat treatment was performed through the process following heat pattern H1 shown in FIG. 14. Further, high-frequency induction heating was performed so that a resultant hardened layer has the pattern as shown in FIG. 11(b).

Test bearing No. 4 (comparative example 1): High-frequency induction heating was performed so that a resultant hardened layer has the pattern as shown in FIG. 10.

Test bearing No. 5 (comparative example 2): Heat treatment was performed through the process following heat pattern H1 shown in FIG. 14. Further, high-frequency induction heating was performed so that a resultant hardened layer has the pattern as shown in FIG. 10.

For the outer ring of each test bearing, the standard heat-treated product (quenched, tempered) was used. Rollers of each test bearing were produced through the following history.

Test bearings No. 1, No. 4: standard heat-treated product (quenched, tempered)

Test bearings No. 2, No. 3, No. 5: carbonitrided product

The results of a material property check and a functional evaluation test for the inner rings of the test bearings produced by the above-described method are shown in Table 19.

(4) Surface hardness: The surface hardness of a central portion of the rolling surface after grinding was measured. The measurement was taken using a Vickers hardness tester (1 kgf).

(5) Area ratio of spherical carbide: The area ratio of the spherical carbide was measured using picric acid in alcohol (picral) for corroding, and thereafter observation and measurement were done with an optical microscope (×400). As the area ratio of the spherical carbide, the measurement in a surface layer of 50 µm of a central portion of the rolling surface after grinding was used.

(6) Static crack strength test: The inner ring of the test bearing was used to apply a load by means of an Amsler's testing machine to perform a static crack strength test.

(7) Crack fatigue strength test: The inner ring of the test bearing was used to conduct a crack fatigue strength test under the conditions shown in Table 3.

(8) Rolling fatigue life: The rolling fatigue life was tested using the tester shown in FIG. 16 under the conditions shown in Table 2. The tester shown in FIG. 16 is a tester for rotation of the outer ring. Referring to FIG. 16, a plurality of needle rollers 53 (3) were placed rollably between an inner ring 52 (2) and an outer ring 54 (3) that were incorporated in the tester. Outer ring 54 was rotated at a predetermined speed under a radial load applied by members 55, 66 to conduct the rolling fatigue life test.

In Table 19, as for the results of the rolling fatigue life test, static crack strength test and crack fatigue strength test, the result for each test bearing is represented as a ratio relative to the value 1 of standard heat-treated product No. 4.

The test results shown in Table 1 are described.

TABLE 19

| No. | Austenite crystal grain size (JIS) | amount of retained austenite (vol %) | nitrogen content (mass %) | surface hardness (HV) | area ratio of spherical carbide (%) | hardened layer pattern | relative static crack strength | relative crack fatigue strength | relative rolling fatigue life | notes* |
|---|---|---|---|---|---|---|---|---|---|---|
| 1 | 11 | 10 | 0 | 760 | 10.2 | FIG. 11(b) | 1.7 | 2.4 | 1.2 | Ex 1 of the invention |
| 2 | 12 | 20 | 0.12 | 780 | 13.6 | FIG. 11(b) | 1.6 | 3.2 | 3.2 | Ex 2 of the invention |
| 3 | 12 | 35 | 0.28 | 770 | 13.0 | FIG. 11(b) | 1.6 | 3.3 | 3.5 | Ex 3 of the invention |
| 4 | 9 | 8 | 0 | 740 | 8.9 | FIG. 10 | 1 | 1 | 1 | Com Ex 1 |
| 5 | 9 | 29 | 0.31 | 760 | 9.6 | FIG. 10 | 0.9 | 1.2 | 2.9 | Com Ex 2 |

*Ex: Example, Com Ex: Comparative Example

The methods of the material property check and functional evaluation test are described below.

(1) Austenite crystal grain size: The austenite crystal grain size was measured according to the method of testing the crystal grain size of austenite in a steel as defined by JIS G 0551.

(2) Amount of retained austenite: The amount of retained austenite was measured by means of the X-ray diffraction by making a comparison between respective diffraction strengths of martensite α (211) and retained austenite γ (220). As the amount of retained austenite, the measurement in a surface layer of 50 µm of the rolling surface after grinding was employed.

(3) Nitrogen content: The nitrogen content was measured using EPMA. As the nitrogen content, the measurement in a surface layer of 50 µm of the rolling surface after grinding was employed.

(1) Austenite Crystal Grain Size

Products No. 1 to No. 3 of the present invention have respective crystal grain size numbers of 11 to 12, which means that austenite grains are remarkably made fine. The standard heat-treated product and the carbonitrided product, namely products No. 4 and No. 5 have the crystal grain size number 9, which means these products have larger austenite crystal grains than those of the products of the present invention.

(2) Amount of Retained Austenite

Products No. 2, No. 3 of the present invention have a retained austenite amount of 20 to 35% by volume, which means that an appropriate amount of austenite is contained.

(3) Nitrogen Content

Products No. 2, No. 3 of the present invention have a nitrogen content of 0.12 to 0.28% by mass.

(4) Surface Hardness

Products No. 2, No. 3 of the present invention have a surface hardness of HV 770 to 780.

(5) Area Ratio of Spherical Carbide

Products No. 2, No. 3 of the present invention have an area ratio of the spherical carbide of 13.0 to 13.6%.

(6) Static Crack Strength Test

Products No. 1 to No. 3 of the present invention have a higher and thus improved static crack strength than that of comparative products No. 4, No. 5. The reason therefor is considered that, under the condition that a load is applied to the bearing, the inner ring (of the comparative product) having both of the hardened layer and the unhardened layer in a mixed state as shown in FIG. 10 is, as compared with the inner ring (of the present invention) in which the hardened layer is formed entirely from the outer circumferential surface to the inner circumferential surface as shown in FIG. 11(a) and FIG. 11(b), lower in strength and thus likely to deform, resulting in a large tensile stress generated at a central portion of the inner circumferential surface.

(7) Crack Fatigue Strength Test

Product No. 1 of the present invention has the crack fatigue strength that is improved to be at least twice as high as that of comparative product No. 4. Further, Products No. 2, No. 3 of the present invention have the crack fatigue strength that is also improved to be approximately three times as high as that of comparative product No. 5. The reason therefor is considered that, under the condition that a load is applied to the bearing, the inner ring (of the comparable product) having both of the hardened layer and the unhardened layer in a mixed state as shown in FIG. 10 is, as compared with the inner ring (of the present invention) in which the hardened layer is formed entirely from the outer circumferential surface to the inner circumferential surface as shown in FIG. 11(a) and FIG.(b), lower in strength and thus likely to deform, resulting in a large tensile stress generated at a central portion of the inner circumferential surface.

(8) Rolling Fatigue Life Test

Product No. 1 of the present invention is slightly improved in rolling fatigue life relative to comparative product No. 4. Further, Products No. 2, No. 3 of the present invention are slightly improved in rolling fatigue life relative to comparative product No. 5. It is considered that the longer rolling fatigue life of Sample Nos. 2, 3, 5 as compared with Sample Nos. 1, 4 is achieved by the presence of the nitrogen-rich layer. It is considered that the nitrogen-rich layer thus favorably influences the rolling fatigue life by such factors as the retained austenite amount, nitrogen content and the surface ratio of the spherical carbide.

In summary, products No. 1 to No. 3 of the present invention have the hardened layer pattern as shown in FIG. 11(a), FIG. 11(b) and thus have the hardened layer that extends, from the surface layer of the rolling surface of the outer circumferential surface of the inner ring, to the inner circumferential surface, and accordingly the static crack strength and the static fatigue strength can be improved. Further, products No. 2, No. 3 of the present invention have the surface layer containing the nitrogen-rich layer, austenite crystal grains that are made fine to have a crystal grain number exceeding 10, an appropriate amount of retained austenite, an appropriate surface hardness, and a high area ratio of the spherical carbide, and thus they are improved in usual load-dependent rolling fatigue life and crack fatigue strength.

It should be understood that embodiments and examples herein disclosed are by way of illustration in every respects, not by way of limitation. It is intended that the scope of the present invention is defined by claims, not by the description above, and includes all modifications equivalent in meaning and scope to the claims.

INDUSTRIAL APPLICABILITY

The present invention is particularly advantageously applicable to a rocker arm rolling bearing used for a rocker arm for opening/closing an intake valve or exhaust valve of an automobile engine.

The invention claimed is:

1. A rolling bearing for a rocker arm comprising:
   an outer ring in rolling contact with a camshaft of an engine;
   an inner ring placed inside said outer ring and fixed to the rocker arm; and
   a plurality of rolling elements provided between said outer ring and said inner ring, wherein
   at least one of said outer ring, said inner ring and said rolling elements has a nitrogen-rich layer, an austenite crystal grain size number in a range exceeding 10, a surface hardness Hv of at least 653, and said nitrogen-rich layer has an area ratio of a spherical carbide of at least 10%.

2. The rolling bearing for the rocker arm according to claim 1, wherein
   said surface hardness Hv is at least 720 and at most 800.

3. The rolling bearing for the rocker arm according to claim 1, wherein
   said rocker arm is pivotably attached to a pivot shaft placed between one end and the other end of said rocker arm, an end portion of an open/close valve of said engine abuts on said one end, said rocker arm has, at said other end, a bifurcated inner-ring support portion, and said inner ring is fixed to said bifurcated inner-ring support portion.

4. The rolling bearing for the rocker arm according to claim 1, wherein
   said rolling bearing is provided between one end and the other end of said rocker arm,
   said inner ring is fixed in an inner-ring hole extending between two sidewalls of said rocker arm, an end portion of an open/close valve of said engine abuts on said one end of said rocker arm, and a pivot abuts on the other end of said rocker arm.

5. The rolling bearing for the rocker arm according to claim 1, wherein
   said rocker arm has a rocker arm body and an interlocking rod transmitting a stress from said camshaft, said rocker arm body is pivotably attached to a pivot shaft placed between one end and the other end of said rocker arm body, an end portion of an open/close valve of said engine abuts on said one end of said rocker arm body, one end portion of said interlocking rod abuts on said other end of said rocker arm body, and said inner ring is fixed to the other end portion of said interlocking rod.

6. The rolling bearing for the rocker arm according to claim 1, wherein
   said rolling bearing is a full-type needle bearing.

7. A rolling bearing for a rocker arm comprising:
   an inner ring fixed to the rocker arm provided between a valve and a cam of an engine to adjust intake air and exhaust air;
   an outer ring placed outside said inner ring and contacting said cam; and
   a plurality of rolling elements placed between said outer ring and said inner ring, wherein at least one of said outer ring, said inner ring and said rolling elements has a nitrogen-rich layer, an austenite crystal grain size number of said nitrogen-rich layer is in a range exceeding 10, an amount of retained austenite of said nitrogen-rich layer is, in a surface layer portion of a rolling surface after grinding, in a range of 11% by volume to 25% by volume, and said nitrogen-rich layer has an area ratio of a spherical carbide of at least 10%.

8. The rolling bearing for the rocker arm according to claim 7, wherein
nitrogen content of said nitrogen-rich layer is, in the surface layer portion of the rolling surface after grinding, in a range of 0.1% by weight to 0.7% by weight.

9. The rolling bearing for the rocker arm according to claim 7, wherein
said rocker arm is pivotably attached to a pivot shaft placed between one end and the other end of said rocker arm, said one end has a bifurcated inner-ring support portion, said inner ring is fixed to said bifurcated inner-ring support portion, and an end portion of a valve of said engine abuts on said other end.

10. The rolling bearing for the rocker arm according to claim 7, wherein
an end portion of a valve of said engine abuts on one end of said rocker arm, a pivot is fitted to the other end thereof, and said inner ring is fixed in an inner-ring hole of two opposing sidewalls between said one end and said other end of said rocker arm.

11. The rolling bearing for the rocker arm according to claim 7, wherein
said rocker arm is pivotably supported on a pivot shaft placed between one end and the other end of said rocker arm, an end portion of a valve of said engine abuts on said one end, one end portion of an interlocking rod transmitting a stress from said camshaft abuts on said other end, said inner ring of said rolling bearing for the rocker arm is fixed to the other end portion of said interlocking rod, and said outer ring contacts said cam.

12. The rolling bearing for the rocker arm according to claim 7, wherein
said rolling bearing for the rocker arm is a full-type needle bearing.

13. A rolling bearing for a rocker arm comprising:
an outer ring in rolling contact with a camshaft of an engine;
an inner ring placed inside said outer ring and fixed to the rocker arm; and
a plurality of rolling elements provided between said outer ring and said inner ring, wherein
all of said outer ring, said inner ring and said rolling elements have a nitrogen-rich layer,
said nitrogen-rich layer of at least one of said inner ring and said rolling elements has an austenite crystal grain size number in a range exceeding 10, an amount of retained austenite of said at least one of said inner ring and said rolling elements is at least 11% by volume and at most 25% by volume, nitrogen content of said at least one of said inner ring and said rolling elements is at least 0.1% by mass and at most 0.7% by mass, and said nitrogen-rich layer has an area ratio of a spherical carbide of at least 10%.

14. The rolling bearing for the rocker arm according to claim 13, wherein
said rocker arm is attached to a rocker arm shaft placed between one end and the other end of said rocker arm, an end portion of a valve of said engine abuts on said one end, said rocker arm has, at said other end, a bifurcated inner-ring support portion, and said inner ring is fixed to said bifurcated inner-ring support portion.

15. The rolling bearing for the rocker arm according to claim 13, wherein
said rolling bearing is provided between one end and the other end of said rocker arm,
said inner ring is fixed in an inner-ring hole extending between two sidewalls of said rocker arm, an end portion of an open/close valve of said engine abuts on said one end of said rocker arm, and a pivot abuts on the other end of said rocker arm.

16. The rolling bearing for the rocker arm according to claim 13, wherein
said rocker arm has a rocker arm body and an interlocking rod transmitting a stress from said camshaft, said rocker arm body is attached to a rocker arm shaft placed between one end and the other end of said rocker arm body, an end portion of an open/close valve of said engine abuts on said one end of said rocker arm body, one end portion of said interlocking rod abuts on the other end of said rocker arm body, and said inner ring is fixed to the other end portion of said interlocking rod.

17. A rolling bearing for a rocker arm comprising:
an outer ring in rolling contact with a camshaft of an engine;
an inner ring placed inside said outer ring and fixed to the rocker arm; and
a plurality of rolling elements provided between said outer ring and said inner ring, wherein
at least one member of members that are said outer ring, said inner ring and said rolling elements has a nitrogen-rich layer, said member having said nitrogen-rich layer has an austenite crystal grain size number in a range exceeding 10, and said member having said nitrogen-rich layer has an area ratio of a spherical carbide of at least 10%.

18. The rolling bearing for the rocker arm according to claim 17, wherein
the area ratio of the spherical carbide of said member having said nitrogen-rich layer is at least 10% and at most 25%.

19. The rolling bearing for the rocker arm according to claim 17, wherein
said rocker arm is pivotably attached to a pivot shaft placed between one end and the other end of said rocker arm, an end portion of an open/close valve of said engine abuts on said one end, said rocker arm has, at said other end, a bifurcated inner-ring support portion, and said inner ring is fixed to said bifurcated inner-ring support portion.

20. The rolling bearing for the rocker arm according to claim 17, wherein
said rolling bearing is provided between one end and the other end of said rocker arm,
said inner ring is fixed in an inner-ring hole extending between two sidewalls of said rocker arm, an end portion of an open/close valve of said engine abuts on said one end of said rocker arm, and a pivot abuts on the other end of said rocker arm.

21. The rolling bearing for the rocker arm according to claim 17, wherein
said rocker arm has a rocker arm body and an interlocking rod transmitting a stress from said camshaft, said rocker arm body is pivotably attached to a pivot shaft placed between one end and the other end of said rocker arm body, an end portion of an open/close valve of said engine abuts on said one end of said rocker arm body, one end portion of said interlocking rod abuts on said other end of said rocker arm body, and said inner ring is fixed to the other end portion of said interlocking rod.

22. The rolling bearing for the rocker arm according to claim 17, wherein
said rolling bearing is a full-type needle bearing.

23. A rolling bearing for a rocker arm comprising:
an outer ring in rolling contact with a camshaft of an engine;
an inner ring placed inside said outer ring; and
a plurality of rolling elements provided between said outer ring and said inner ring, wherein
said inner ring is made of a steel containing at least 0.50% by mass of carbon, has a hollow cylindrical shape, has an end surface with a hardness of at least HV 200 and at most HV 300, has a hardened layer extending entirely in the radial direction from a rolling surface of said inner ring where said rolling elements roll to an inner circumferential surface of said inner ring, a surface layer portion of the rolling surface of said inner ring contains a nitrogen-rich layer, and the nitrogen-rich layer has an area of spherical carbides of at least 10%.

24. The rolling bearing for the rocker arm according to claim 23, wherein
a surface layer portion of the rolling surface of said inner ring has an austenite crystal grain size number in a range exceeding 10, and said austenite crystal grain size number is a value in a surface layer of 50 μm of the rolling surface after grinding.

25. The rolling bearing for the rocker arm according to claim 23, wherein
the surface layer portion of the rolling surface of said inner ring has an amount of retained austenite of at least 11% by volume and at most 40% by volume, and said amount of retained austenite is a value in a surface layer of 50 μm of the rolling surface after grinding.

26. The rolling bearing for the rocker arm according to claim 23, wherein
said nitrogen-rich layer has a nitrogen content in a range of at least 0.1% by mass and at most 0.7% by mass, and said nitrogen content is a value in a surface layer of 50 μm of the rolling surface after grinding.

27. The rolling bearing for the rocker arm according to claim 23, wherein
the rolling surface of said inner ring has a surface hardness of at least HV 653.

28. The rolling bearing for the rocker arm according to claim 23, wherein
the nitrogen-rich layer of the surface layer portion of the rolling surface of said inner ring has an area ratio of a spherical carbide of at least 10%, and said area ratio of the spherical carbide is a value in a surface layer of 50 μm of the rolling surface after grinding.

29. The rolling bearing for the rocker arm according to claim 23, wherein
said rocker arm is attached to a rocker arm shaft placed between one end and the other end of said rocker arm, a bifurcated inner-ring support portion is provided at said one end of said rocker arm, an end portion of an open/close valve of said engine abuts on said other end, and said inner ring is fixed to said bifurcated inner-ring support portion.

30. The rolling bearing for the rocker arm according to claim 23, wherein
a pivot abuts on one end of said rocker arm, said rolling bearing is provided between said one end and the other end of said rocker arm, and an end portion of an open/close valve of said engine abuts on said other end.

31. The rolling bearing for the rocker arm according to claim 23, wherein
said rocker arm is attached to a rocker arm shaft placed between one end and the other end of said rocker arm, one end portion of an interlocking rod transmitting a stress from said camshaft abuts on said one end of said rocker arm, an end portion of an open/close valve of said engine abuts on said other end, and said rolling bearing is provided at the other end portion of said interlocking rod.

32. The rolling bearing for the rocker arm according to claim 23, wherein
said rolling bearing is a full-type needle bearing.

* * * * *